US012781535B2

(12) United States Patent
Lai

(10) Patent No.: US 12,781,535 B2
(45) Date of Patent: Nov. 3, 2026

(54) OBJECT SHAPED PADLOCK WITH KEY AND COMBINATION MECHANISMS HAVING NON-CAPTIVE AND CAPTIVE KEY FUNCTIONS

(71) Applicant: The Sun Lock Company Limited, Tuen Mun (HK)

(72) Inventor: Karl Lai, Tai Po (HK)

(73) Assignee: The Sun Lock Company Limited, Tuen Mun (HK)

( * ) Notice: Subject to any disclaimer, the term of this patent is extended or adjusted under 35 U.S.C. 154(b) by 173 days.

(21) Appl. No.: 18/626,564

(22) Filed: Apr. 4, 2024

(65) Prior Publication Data

US 2024/0352767 A1 Oct. 24, 2024

Related U.S. Application Data

(60) Provisional application No. 63/503,907, filed on May 23, 2023, provisional application No. 63/460,098, filed on Apr. 18, 2023.

(51) Int. Cl.

| | |
|---|---|
| ***E05B 37/00*** | (2006.01) |
| ***E05B 37/14*** | (2006.01) |
| ***E05B 67/00*** | (2006.01) |

(52) U.S. Cl.

CPC .......... *E05B 37/0034* (2013.01); *E05B 37/14* (2013.01); *E05B 67/003* (2013.01)

(58) Field of Classification Search

CPC .. E05B 37/0031; E05B 37/0034; E05B 37/12; E05B 37/14; E05B 67/003

See application file for complete search history.

(56) References Cited

U.S. PATENT DOCUMENTS

| | | | |
|---|---|---|---|
| 589,844 | A | 9/1897 | Lownes |
| 1,001,104 | A | 8/1911 | Peter |
| 1,348,234 | A | 8/1920 | Mock et al. |
| 1,356,314 | A | 10/1920 | Sabbag |
| 1,522,851 | A | 1/1925 | Wright |
| 1,580,573 | A | 4/1926 | Schara |

(Continued)

FOREIGN PATENT DOCUMENTS

| | | | |
|---|---|---|---|
| CN | 106014006 | A | 10/2016 |
| CN | 108026735 | A | 5/2018 |

(Continued)

OTHER PUBLICATIONS

EPO, Extended European Search Report for EP Appl. No. 24169502.2 (Oct. 4, 2024).

(Continued)

*Primary Examiner* — Christopher J Boswell

(74) *Attorney, Agent, or Firm* — Ware, Fressola, Maguire & Barber LLP

(57) ABSTRACT

An object padlock having an object looking shaped housing, at least one dial to control the opening of the padlock via a combination mechanism, a locking means such as a cable with one end always in the padlock and another end, such as the flexible-end, that can be locked and opened via the combination mode, at least a cylinder to control the opening of the padlock via a key mechanism which, and a non-captive key mechanism or a captive key mechanism when the padlock operated by the key mechanism to the unlocked mode.

16 Claims, 25 Drawing Sheets

(56) References Cited

U.S. PATENT DOCUMENTS 1,897,922 A 2/1933 Bradshaw
2,378,768 A 6/1945 Heyer
3,349,584 A 10/1967 Russell et al.
3,386,271 A 6/1968 Morin
3,410,121 A 11/1968 Morin
3,472,049 A 10/1969 Sewell
3,720,082 A 3/1973 Feinberg et al.
4,444,029 A 4/1984 Remington
4,733,548 A 3/1988 Ling
5,156,028 A 10/1992 Jiang
5,664,446 A 9/1997 Kusmiss
5,715,709 A 2/1998 Lai
5,918,489 A * 7/1999 Yang .................... E05B 37/0068 70/52
5,953,940 A 9/1999 Ling
6,227,016 B1 5/2001 Yu
6,363,758 B1 4/2002 Ling
6,408,660 B1 6/2002 Lai
7,007,520 B1 * 3/2006 Lin .......................... E05B 37/14 70/284
7,104,092 B2 * 9/2006 Yu ............................ E05B 37/02 70/284
7,117,698 B2 10/2006 Lai
7,370,498 B1 5/2008 Miao
7,467,531 B2 12/2008 Lai et al.
7,523,628 B2 4/2009 Yu
7,562,545 B2 7/2009 Lai et al.
7,685,851 B2 3/2010 Lai
7,832,238 B2 * 11/2010 Misner ................ E05B 37/0034 70/432
7,891,220 B2 * 2/2011 Yen ..................... E05B 73/0005 70/52
8,261,583 B2 9/2012 Lai et al.
8,931,313 B2 1/2015 Lai
9,663,970 B1 * 5/2017 Yang ..................... E05B 35/105
9,890,559 B2 2/2018 Lai
10,221,591 B2 3/2019 Lai
10,443,272 B2 10/2019 Lai
D914,481 S 3/2021 Lai
11,828,089 B2 * 11/2023 Yu .......................... E05B 37/025
D1,011,865 S 1/2024 Lai
12,448,813 B2 * 10/2025 Lai .......................... E05B 37/14
2006/0170550 A1 8/2006 Marsilio et al.
2009/0113947 A1 5/2009 Lai et al.
2009/0120141 A1 5/2009 Huang
2009/0249841 A1 10/2009 Holmes
2010/0095718 A1 4/2010 Lai et al.
2012/0304711 A1 12/2012 Misner et al.
2016/0186466 A1 6/2016 Ng
2020/0318390 A1 10/2020 Bartel
2022/0065001 A1 3/2022 Lai
2023/0212887 A1 * 7/2023 Lai .......................... E05B 37/14 70/20
2024/0044172 A1 2/2024 Yu
2024/0352767 A1 10/2024 Lai

FOREIGN PATENT DOCUMENTS

CN 109826499 A 5/2019
CN 109944511 A 6/2019
CN 110528972 A 12/2019
CN 110685512 A 1/2020
CN 212642398 U 3/2021
CN 114109155 A 3/2022
EP 1120517 A2 8/2001
FR 36073 4/1930
GB 605018 7/1948
KR 9116962 10/1991
SU 636356 A1 12/1978

OTHER PUBLICATIONS

"Car Shaped Multi Use Padlock Combination Lock Metal for Small Locks Box Bike Etc" Ebay. https://www.ebay.com/itm/126674065263 (Year: 2024).
"Green 3 Digit Combination Padlock" Amazon. https://www.amazon.com/Combination-Stainless-Strenght-Suitcase-Padlocks/dp/B0CL8PFVS7/ref=pd_ci_mcx_di_int_socia_cn_d_sccl_2_7/142-2535282-9307525?pd_rd_w=VsLmR&content-id=amzn1.sym.751acc83-5c05-42d0-a15e-303622651e1e&pf_rd_p=751acc83-5c05-42d0-a15e-30 (Year: 2023).
"Surelock TSA Compatible Travel Luggage Locks, Inspection Indicator Car Lock" IBSPOT. https://ibspot.com/products/sure-lock-tsa-compatible-travel-luggage-locks-inspection-indicator-car-lock-grey (Year: 2024).

* cited by examiner

OBJECT SHAPED PADLOCK WITH KEY AND COMBINATION MECHANISMS HAVING NON-CAPTIVE AND CAPTIVE KEY FUNCTIONS

CROSS-REFERENCE TO RELATED APPLICATIONS

This application claims priority to U.S. Provisional Appl. No. 63/460,098 filed Apr. 18, 2023, and U.S. Provisional Appl. No. 63/503,907 filed May 23, 2023, both of which are hereby incorporated by reference in their entireties.

BACKGROUND OF THE INVENTION

1. Field of the Invention

This present invention generally relates to a padlock having a car shaped design with combination and key mechanisms, and more particularly, to a padlock having a non-captive or captive key to increase the security level, and facilitate efficient opening and closing of the padlock by operation of the key function.

2. Related Art

There are several combination padlocks with single or even dual locking mechanisms currently on the market. However, most of these padlocks are traditionally shaped and have a mechanical combination mechanism, for example, U.S. Pat. Nos. 5,715,709 and 8,261,583, which are hereby incorporated by reference in their entireties. However, none of these padlocks show a combination padlock which contains an object shape, such as a car. Object shaped padlocks may improve marketing strategies for promotion of padlocks, by, for example, providing a car shaped padlock which has four wheels comprising the combination mechanism of the padlock. Instead of a stack of combination dials joined together, the object shaped padlock can create a locking construction to make the four combination dials act as car wheels with a different locking mechanism than the prior art.

SUMMARY OF THE INVENTION

An exemplary aspect of the present invention is directed to a padlock with a car shaped external-cover, base-cover, and a set of combined-dials that have an appearance of vehicle tires. In addition, a locking means such as a cable, having different lock-ends, a fixed-end and a flexible-end, is controlled by a combination mechanism having a correct code combination, and/or a key mechanism having a correct cut key to control the opening and closing, i.e., retention or release of the cable of the object shaped, e.g. car shaped, padlock. The present invention is not limited to a particular mechanical mechanism, and more than one unlocking feature can be added in such a padlock. The invention may use a set of combined-dials which are mounted like vehicle tires/wheels to form a car shape locking padlock having physical functionality of the wheels. If at least one combined-dial is not in the correct code combination, the entire locking mechanism of the padlock cannot be opened via the combination mechanism. If the correct cut key is not present, then the padlock cannot be opened by the key mechanism. If all the combined-dials have been set to the correct code combination, a button may be configured to open the padlock. If the correct code combination has not been set on all of the combined-dials, then the padlock will not be able to be unlocked, i.e., the flexible-end of the cable cannot be released from the external-cover, base-body and/or interior-cover of the padlock. A wheel cover may be mounted on each combined-dial to serve as a decoration and to cover the internal mechanism of the combination mechanism. The padlock may contain a reset mechanism such as a reset button on each clutch corresponding to each combined-dial in order to reset and/or reconfigure the correct code combination for the combination mechanism.

According to an exemplary aspect of the present invention, a padlock is provided having, an external cover coupled to a base body to form a housing of the padlock, a cable having a fixed end retained within the housing, and a flexible end retained within the housing when the padlock is in a locked mode, and removable from the housing when the padlock is in an unlocked mode, a combination mechanism having at least one combined dial and configured to allow operation of the padlock from the locked mode to the unlocked mode, a key mechanism having a cylinder configured for operation by a correct cut key, the key mechanism is configured to allow operation of the padlock from the locked mode to the unlocked mode, a cam operable between a locked position and a first unlocked position by the combination mechanism, and operable between the locked position and a second unlocked position by the key mechanism, when the cam is in the first unlocked position or the second unlocked position the padlock may be placed in the unlocked mode, and a short cam operably coupling the cylinder and the cam, the short cam is configured to provide either captive key functionality or non-captive key functionality of the correct cut key when the padlock is in the unlocked mode.

According to this and other exemplary aspects of the present invention, the external cover has an appearance of a wheeled vehicle, and the at least one combined dial has an appearance of a wheel of the wheeled vehicle.

According to this and other exemplary aspects of the present invention, the combination mechanism may include four combined dials, two of the four combined dials are positioned on one side of the external cover, and the other two of the four combined dials are positioned on another side of the external cover to provide an appearance of the wheels of the wheeled vehicle, and each of the combined dials include a plurality of indicia selected from numbers, letters, signs, shapes, symbols, characters, or combinations thereof, and a combination of one indicia from each of the combined dials comprises a correct code combination for the combination mechanism.

According to this and other exemplary aspects of the present invention, the combination mechanism may include at least one clutch for each of the at least one combined dial, each combined dial may include a plurality of teeth, and each clutch may include a teeth slot for each of the plurality of teeth of the combined dial, and the teeth slots of the clutch are configured for operative engagement with the plurality of teeth of the combined dial such that rotation of the combined dial is transferred to rotation of the clutch.

According to this and other exemplary aspects of the present invention, the combination mechanism may also include at least one control plate, each control plate is operatively connected to at least one clutch of the at least one clutches, the combination mechanism may further include a connecting plate operatively connecting the at least one control plate with the cam, and the combination mechanism may also include a button operatively connected to the at least one control plate.

According to this and other exemplary aspects of the present invention, each of the at least one control plate may include at least one extended pin, and each clutch of the at least one clutch contains a true gate and at least one false gate configured for engagement with one of the at least one extended pin, the padlock may be operated from the locked mode to the unlocked mode when each of the at least one extended pin engages with the true gate of the corresponding clutch of the at least one clutch, and the false gates do not allow the padlock to be operated from the locked mode to the unlocked mode if at least one extended pin of the at least one extended pin is engaged with the false gate.

According to this and other exemplary aspects of the present invention, the control plate may include at least one cutout configured to receive an extended-pointer of the connected plate and a wing of the button, movement of any of the control plate, connected plate or button will be transferred to other two, and the control plate, connected plate and button move jointly together.

According to this and other exemplary aspects of the present invention, the connected plate may include a contact wall having two halves and configured for engagement with the cam, the cam may also include an extended radius configured for positioning between the two halves of the contact wall, and rectilinear movement of the connected plate within the housing of the padlock controls movement of the cam between the locked position and the first unlocked position.

According to this and other exemplary aspects of the present invention, the padlock may also include a bolt configured to lockenly engage the flexible end of the cable when the padlock is in the locked mode, and having a flat end and a round end, the cam may include a lock surface configured for engagement with the flat end of the bolt when the padlock is in the locked mode, and a slope configured for engagement with the flat end of the bolt when the cam is in the first unlocked position and the padlock is in the unlocked mode, and rectilinear movement of the connected plate within the housing of the padlock controls movement of the cam between the locked position and the first unlocked position.

According to this and other exemplary aspects of the present invention, the key mechanism may also include an extended cam operatively coupled to the cam and the short cam, the extended cam may include a slot configured for engagement with the short cam, and rotational movement of the cylinder is transferred to the extended cam by the short cam, and to the cam by the extended cam.

According to this and other exemplary aspects of the present invention, the padlock may also include a bolt configured to lockenly engage the flexible end of the cable when the padlock is in the locked mode, and having a flat end and a round end, and the cam may include a lock surface configured for contact with the flat end of the bolt when the padlock is in the locked mode, and a flat side configured for contact with the flat end of the bolt when the padlock is in the unlocked mode.

According to this and other exemplary aspects of the present invention, the correct cut key is configured to cause rotational movement of the cylinder, and the rotational movement of the cylinder is transferred to the cam by the short cam and the extended cam, the rotational movement of the cam causes movement of the cam from the locked position in which the lock surface of the cam is in contact with the flat end of the bolt to the second unlocked position in which the flat side of the cam is in contact with the flat end of the bolt.

According to this and other exemplary aspects of the present invention, the extended cam may further include a pass way, and the cam may further include a tail of the cam configured for at least partial insertion into the pass way of the extended cam, and the pass way and the tail have complementary shapes such that rotational movement of the extended cam is transferred to the cam.

According to this and other exemplary aspects of the present invention, the short cam may include a surface to contact the slot of the extended-cam when the padlock has been operated to the unlocked mode by the key mechanism, and as a result of the contact between the surface and the slot a captive key mechanism is configured to retain the correct cut key within the cylinder until the padlock has been returned to the locked mode.

According to this and other exemplary aspects of the present invention, the padlock may also include a torque spring configured to rotate the extended-cam when the padlock is returned to the locked mode so the correct cut key can be withdrawn from the cylinder.

According to this and other exemplary aspects of the present invention, the short cam may include a free rotate area to allow rotation of the short cam and cylinder without rotation of the extended cam to provide a non-captive key mechanism so that the correct cut key may be withdrawn from the cylinder while the padlock is in the unlocked mode.

According to this and other exemplary aspects of the present invention, the padlock may also include a rod engaged with a spring configured for operable engagement with the flexible end of the cable to cause the flexible end of the cable to pop out of the housing of the padlock when the cam is in the first unlocked position or the second unlocked position.

According to this and other exemplary aspects of the present invention, each clutch of the at least one clutch may include a reset button extending therefrom, and each control plate of the at least one control plate may include at least one curved surface configured for contact with the corresponding clutch when the padlock is in the locked mode, and configured to be spaced apart from the corresponding clutch when the padlock is in the unlocked mode, and the reset button is configured for receipt of a reset tool configured to separate the clutch from the corresponding combined dial to operate the padlock into a reset mode.

According to this and other exemplary aspects of the present invention, the padlock may include an object looking cover/body shape, at least one dial to control the opening of the padlock as a primary control mechanism called a combination mode, a locking means such as a cable with one end always in the padlock and another end, such as the flexible-end, that can be locked and opened via the combination mode, at least a cylinder to control the opening of the lock as a secondary control mechanism which is called an unlock by key mode, and a short cam having a surface and free rotate area configured to allow the key user to determine to use either non-key-captive relock or key-captive relock.

According to this and other exemplary aspects of the present invention, at least one dial of each side of the lock body/cover forms the object shaped padlock, where there are two dials that form a wheel of each side, for a total of four wheels, two on each side, where the dials are part of the wheels of a vehicle construction.

According to this and other exemplary aspects of the present invention, the combined dial may include an exterior-dial with numbers, letters, signs, shapes, symbols and characters, or combinations thereof, for a user to locate the code, an inner-dial which contains the teeth which are sealed and not able to be seen by a user, and an outer-dial which contains the ratchet slot to give the ratchet feeling of each rotation of the dial.

According to this and other exemplary aspects of the present invention, a clutch member contains a teeth slot to mate with the teeth of the combined-dial.

According to this and other exemplary aspects of the present invention, the clutch member is assembled to the combined-dial to control lock opening via a control-plate.

According to this and other exemplary aspects of the present invention, the control-plate contains an extended-pin and the clutch contains a true gate and false gates to catch the extended-pin, so that only the true gate allows the control-plate to move the most distance to let the padlock be operated to the unlocked mode by the combination mechanism, and so that the false gates are to distract an unauthorized user from lock picking the lock by testing the combination mechanism, where the false gates do not allow the control-plate to travel to a lock open status.

According to this and other exemplary aspects of the present invention, the control-plate has a cutout to receive an extended-pointer of connected plate and a wing of button, so that in such a position, the movement of either one will move the other two, so that this sandwich position makes these three parts move jointly together.

According to this and other exemplary aspects of the present invention, each control-plate has at least one extended pin to align with at least one clutch.

According to this and other exemplary aspects of the present invention, in the locked mode, the clutch cannot be pushed inward to get into the reset mode, and so that the padlock can only be in the reset mode when the padlock is in unlocked mode via the combination mechanism.

According to this and other exemplary aspects of the present invention, the control-plate has a curved-surface which blocks the clutch from moving to the reset position in the locked mode, so that in the unlocked mode by the combination mechanism, the control-plate is pushed upward such that the curved-surface will not block the clutch and allows the clutch to move into the reset mode position.

According to this and other exemplary aspects of the present invention, the control-plate contains a set of holes to let the clutch-spring to pass through and without interfering with the clutch spring function regardless of what mode the padlock is in, so that the padlock when in the locked mode, unlocked mode by the combination mechanism, unlocked mode by the key mechanism, and reset mode, the control-plate will not interfere with the function of the clutch-spring.

According to this and other exemplary aspects of the present invention, the clutch further contains a teeth-slot to engage with the teeth of the combined-dial, so that with the clutch spring pushing the clutch toward this engagement position, the turning of the combined-dial will turn the clutch in the same manner, and by doing so, the alignment of the true gate of the clutch and the extended-pin of the control plate will be controlled by the combined-dial.

According to this and other exemplary aspects of the present invention, the connected-plate contains a contact-wall which has two halves and the extended-radius of the cam is placed inside the contact wall, so that when the button is operated it will push upward, and it will further push the connected plate upward so that as the connected-plate pushes upward the contact-wall will contact the extended-radius to push the cam upward, and the movement of the contact-wall of the connected-plate is mainly controlled by the alignment of the extended-pin of the control-plate and the true-gates of the clutch.

According to this and other exemplary aspects of the present invention, the extended-cam contains a pass way to receive the tail of the cam, where the shape of the pass way and the tail will be in a shape such that the rotation of the extended-cam will transfer to the cam, that is, the pass way and the tail will be in a form of a rectangular shape which allows turning of the extended-cam and cam in the same manner when the padlock is operated to the unlocked mode by the key mechanism.

According to this and other exemplary aspects of the present invention, the pass way contains enough length to allow the tail of the cam to move from the locked mode position to the unlocked mode position when the padlock is operated to the unlocked mode by the combination mechanism.

According to this and other exemplary aspects of the present invention, the combination mechanism may include the combined-dial, clutch, control-plate, connected-plate, button, rod, and these members control the movement of the cam and bolt to let the engagement and disengagement of the bolt and the bolt-receiving-cutout of the flexible-end of the cable.

According to this and other exemplary aspects of the present invention, the combined-dial, and the clutch position are perpendicular to the position of the control-plate, connected, plate, and button.

According to this and other exemplary aspects of the present invention, the reset button is integrated into the clutch and the combined-dial contains a hole to let the button reset member pass through.

According to this and other exemplary aspects of the present invention, the clutch contains more than one false gate to increase the level of difficulty of locating the true gate by an unauthorized user of the padlock.

According to this and other exemplary aspects of the present invention, the clutch contains a true gate which has a deep cut which allows the extended-pin of the control plate to move in when the padlock is in the reset mode.

According to this and other exemplary aspects of the present invention, the cam is assembled to control the bolt locking and unlocking the bolt-receiving-cutout of the flexible-end of the cable, where the cam contains an extended-radius to be placed in the contact-wall of the connected-plate, so that the vertical movement of the cam will be controlled by the connected-plate, so that the cam is in the upward position, then the flat-end of the bolt will move toward the cam and underneath the slope of the cam, and the round-end of the bolt will disengage away from the bolt-receiving-cutout of the flexible-end of the cable, so that a rod will pop upward and the flexible-end will pop away from the housing of the padlock to the unlocked mode.

According to this and other exemplary aspects of the present invention, the cam may include a tail which will be placed in the pass way of the extended-cam, the pass way contains a path for the tail of the cam to engage, and the tail is configured for operation of the key mechanism to control the rotational movement of the cam, the cam will be in the unlocked position when the cam is rotated such that the flat-side of cam aligns to the flat-end of bolt, so that as the cam is rotated the round-end of the bolt will disengage away from the bolt-receiving-cutout of the flexible-end of the cable, and a rod will pop upward and the flexible-end will pop away from the housing of the padlock to the unlocked mode.

According to this and other exemplary aspects of the present invention, the tail of the cam has a shape and size that is placed into the pass way of the extended-cam which the control plate pushes upward and will not interfere with the extended-cam, where the pass way has enough path and area to allow the tail of cam to move upward and downward during unlocking of the padlock via the combination mechanism, and the extended-radius of the cam engages into the contact-wall of the connected-plate when the padlock is operated to the unlocked mode by the combination mechanism.

According to this and other exemplary aspects of the present invention, the tail of the cam has a shape and size which will let the pass way of the extended-cam to rotate such that the rotation of the extended-cam will directly transfer to the cam and the cam can rotate in the same manner.

According to this and other exemplary aspects of the present invention, the movement of the contact-plate will not interfere with the key mechanism comprised of the extended-cam, the short-cam, the cylinder, and these key mechanism members are configured to control the movement of the cam and bolt to let the engagement and disengagement of the bolt and the bolt-receiving-cutout of the flexible-end of the cable.

According to this and other exemplary aspects of the present invention, the short-cam and the extended-cam contain at least one slot to rotate the extended-cam and let the pass way of the extended-cam to contact the tail of the cam and rotate the cam toward the unlocked position.

According to this and other exemplary aspects of the present invention, the extended-cam contains a shape of a top end which restricts the extended-cam from any horizontal movement.

According to this and other exemplary aspects of the present invention, the clutch may include one or more teeth-slots to receive the teeth of the combined dial, so that they will be engaged together when the padlock is not in the reset mode, and disengage in the reset mode and so that a user can push in the reset button on the clutch and the teeth-slot of clutch will disengage away from the teeth of the combined dial and the rotation of the combined dial will not be transferred to the clutch during the reset mode.

According to this and other exemplary aspects of the present invention, the curved-surface of the control plate in the reset mode will move away from blocking the clutch to move inward of the lock body to move into the reset position.

According to this and other exemplary aspects of the present invention, a cam is assembled to control the bolt of the locking and unlocking the bolt-receiving-cutout of the flexible-end of the cable, where the cam contains an extended-radius which is always engaged with the contact wall of the connected plate to control unlocking of the padlock via the combination mechanism, the cam contains a tail which is assembled to the pass way of the extended-cam which has space to yield the tail of the cam to move upward and downward during unlocking of the padlock via the combination mechanism, the cam contains a slope to receive the flat-end of the bolt for unlocking of the padlock via the combination mechanism, so that as the cam is in the upward position, then the flat-end of the bolt will move toward the cam and underneath the slope of cam, the round-end of the bolt will disengage away from the bolt-receiving-cutout of the flexible-end of the cable, and a rod will pop upward and the flexible-end will pop away from the housing of the padlock to the unlocked mode.

According to this and other exemplary aspects of the present invention, the tail of the cam is configured to rotate as the pass way of the extended cam rotates which will rotate the tail of the cam in the same manner, the cam contains a flat-side to receive the flat-end of the bolt during unlocking via the key mechanism and the round-end of the bolt will disengage away from the bolt-receiving-cutout of the flexible-end of the cable, a rod will pop upward and the flexible-end will pop away from the housing of the padlock to the unlocked mode.

According to this and other exemplary aspects of the present invention, the combination mechanism may be comprised of the at least one combined dial, the at least one clutch, the control plate, the connected plate, the button, and the rod, and these members are configured to control the movement of the cam and the bolt to cause the engagement and disengagement of the bolt and the bolt-receiving-cutout of the flexible-end of the cable.

According to this and other exemplary aspects of the present invention, the tail of the cam has a shape and size which will let the pass way of the extended-cam rotate, but will not interfere with the contact-wall of the connected-plate when the padlock is operated from the locked mode to the unlocked mode by the key mechanism.

According to this and other exemplary aspects of the present invention, a torque spring may be configured to rotate the extended-cam back towards the locked mode position and the pass way will cause the tail of the cam to turn in the same manner when the user pushes the flexible-end of the cable back into the padlock to place the padlock in the locked mode such that the round-end of the bolt will engage the bolt receiving cutout of the flexible-end of the cable, and after the bolt is engaged back to the locked mode position then the user can withdraw the correct cut key out of the cylinder.

According to this and other exemplary aspects of the present invention, a spring and rod may be positioned within the padlock and underneath the flexible end of the cable to push the flexible end out of the padlock such that in the unlocked mode, the flexible-end will be popped open.

According to this and other exemplary aspects of the present invention, the short cam may include a surface to contact the slot of the extended cam during operation of the padlock from the locked mode to the unlocked mode via the key mechanism, and after the padlock has been placed in the unlocked mode via the key mechanism, the user can let the correct cut key remain in the cylinder and only be able to remove the correct cut key when the short cam is rotated back to place the padlock in the locked mode as a result of interaction of the slot of the extended cam and the slot of the short cam by a captive key mechanism.

According to this and other exemplary aspects of the present invention, the short cam may include a free rotate area to allow the key user to rotate the short cam and cylinder back to the locked position without the short cam operatively contacting the slot of the extended cam, and withdraw the correct cut key out of the padlock by a non-captive key mechanism, and the extended cam remains in the unlocked mode position while the short cam and the cylinder are in the locked mode position, the torque spring will cause rotation of the extended-cam back to the locked mode position.

The exemplary aspects of the present invention discussed are merely exemplary, and it is understood the present invention is not limited to any particular aspects or combinations thereof. Rather, the present invention encompasses both individual elements of the exemplary aspects alone, and in combination with any other individual elements whether or not specifically recited as an exemplary aspect.

The reference numbers and corresponding elements are summarized below:

| |
|---|
| 10 padlock |
| 20 external-cover |
| 21 fixed-end-hole |
| 22 flexible-end-hole |
| 23 dial-cutout |
| 24 cylinder-cutout |
| 30 base-body |
| 31 fixed-end-hole |
| 32 flexible-end-hole |
| 33 torque-spring-slot |
| 34 bolt-slot |
| 35 locking-cam-slot |
| 36 extended-cam-slot |
| 37 connected-plate-slot |
| 38 control-plate-slot |
| 39 clutch-slot |
| 30a cylinder-slot |
| 30b ratchet-pin-slot |
| 30c extended-pin-slot |
| 30d button-slot |
| 30e spring-loaded-member-slot |
| 30f inner-wheel-slot |
| 30g clutch-spring-wall |
| 30h wing-slot |
| 30i cam stop wall |
| 30j extended-cam-spring-wall |
| 30k torque-spring-tail-slot |
| 40 interior-cover |
| 41 fixed-end-hole |
| 42 flexible-end-hole |
| 44 bolt-slot |
| 45 locking-cam-slot |
| 46 extended-cam-slot |
| 47 control-plate-slot |
| 48 clutch-slot |
| 49 cylinder slot |
| 40a cylinder-turning-angle-control-slot |
| 40b ratchet-pin-slot |
| 40c extended-pin-slot |
| 40d wafer-strengthen-plate-slot |
| 40e spring-loaded-member-slot |
| 40f inner-wheel-slot |
| 40g wing slot |
| 50 cable |
| 51 fixed-end |
| 52 flexible-end |
| 53 bolt-receiving-cutout |
| 54 wing |
| 60 bolt |
| 61 flat-end |
| 62 round-end |
| 70 cam |
| 72 lock-surface |
| 73 extended-radius |
| 74 slope |
| 75 tail |
| 76 flat-side |
| 80 extended-cam |
| 81 pass way |
| 82 slot |
| 83 wall |
| 84 top-end |
| 85 torque-spring-slot |
| 90 short-cam |
| 91 slot |
| 92 holes |
| 100 cylinder |
| 101 pins |
| 102 angle control-member |
| 130 clutch |
| 131 teeth-slot |
| 132 true-gate |
| 133 false-gate |
| 134 spring-hole |
| 135 reset button |
| 140 wheel-cover |
| 141 reset hole |

-continued

| |
|---|
| 150 control-plate |
| 151 curved-surface |
| 152 clutch-spring-hole |
| 153 extended-pin |
| 154 connected-plate-receiving-cutout |
| 160 connected-plate |
| 161 contact-wall |
| 162 spring-wall |
| 163 extended-pointer |
| 170 button |
| 171 extended-wing |
| 172 reset-stopper-hole |
| 180 ratchet-pin-holder |
| 181 ratchet-pins |
| 182 rachet-spring |
| 200 torque spring |
| 210 clutch spring |
| 230 extended-cam spring |
| 250 reset tool |
| 260 key |
| 270 combined-dial |
| 271 teeth |
| 272 reset-hole |
| 273 ratchet-slot |
| 280 rod |
| 281 spring-receive-cutout |
| 282 surface |
| 283 extended-fin |
| 290 rod-spring |
| 300 short-cam |
| 301 surface |
| 302 holes |
| 303 free-rotate-area |

BRIEF DESCRIPTION OF THE SEVERAL VIEWS OF THE DRAWINGS

For a fuller understanding of the nature and object of the present invention, reference should be had to the following detailed description taken in connection with the accompanying drawings, in which.

DETAILED DESCRIPTION

Figure 1:
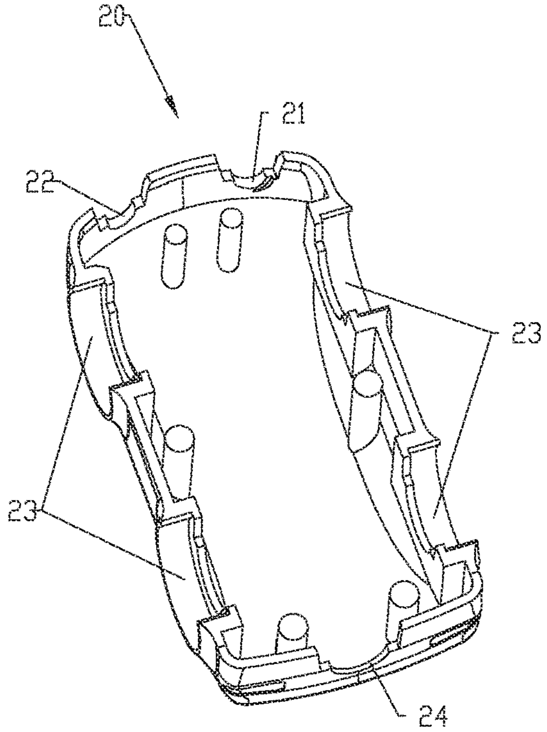
FIG. 1 is a perspective view of an exemplary external cover of an exemplary padlock according to an aspect of the present invention.
Figure 2:
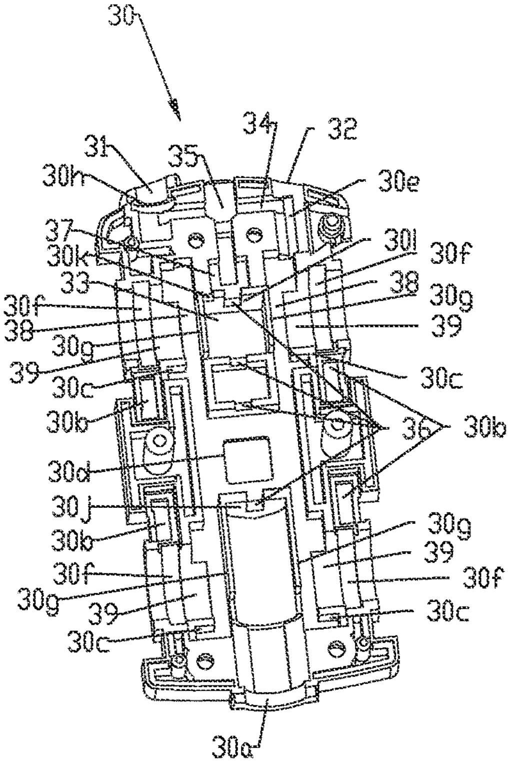
FIG. 2 is a perspective view of an exemplary base-body of an exemplary padlock according to an aspect of the present invention.
Figure 3:
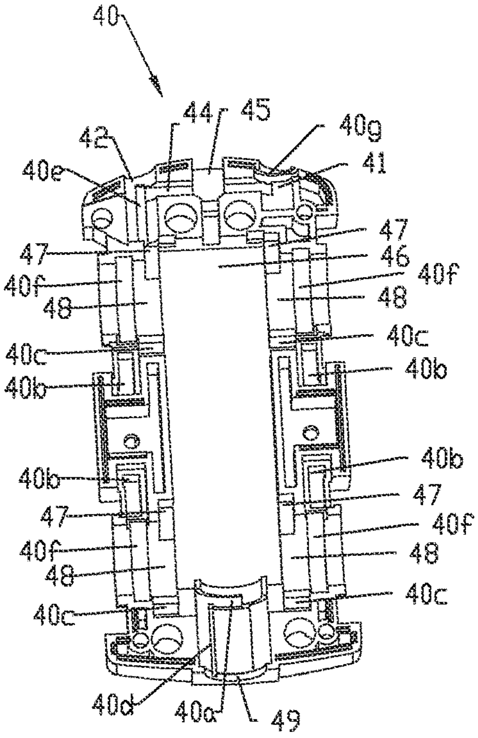
FIG. 3 is a perspective view of an exemplary interior-cover of an exemplary padlock according to an aspect of the present invention.
Figure 4:
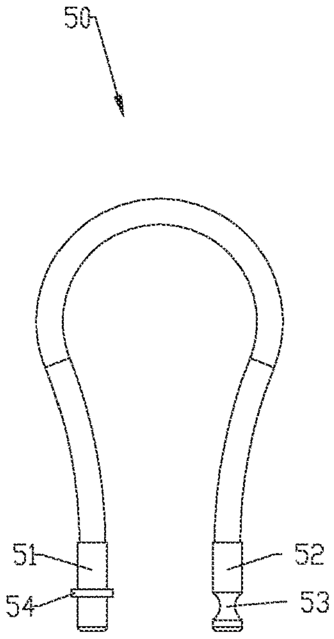
FIG. 4 is a plan view of an exemplary cable of an exemplary padlock according to an aspect of the present invention.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Figure 1A:
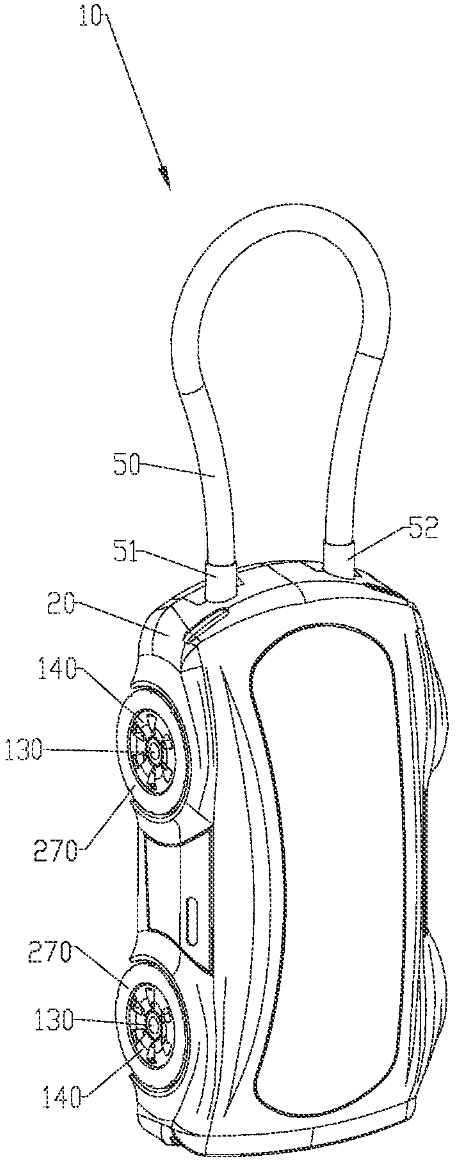
FIG. 1A is a perspective view of an exemplary padlock according to an aspect of the present invention.
Figure 5:
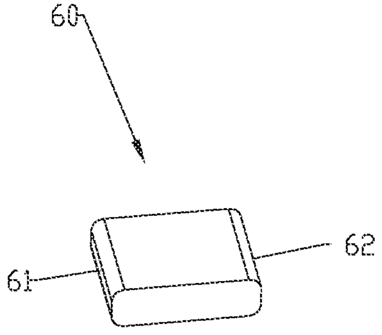
FIG. 5 is a perspective view of an exemplary bolt of an exemplary padlock according to an aspect of the present invention.
Figure 6A:
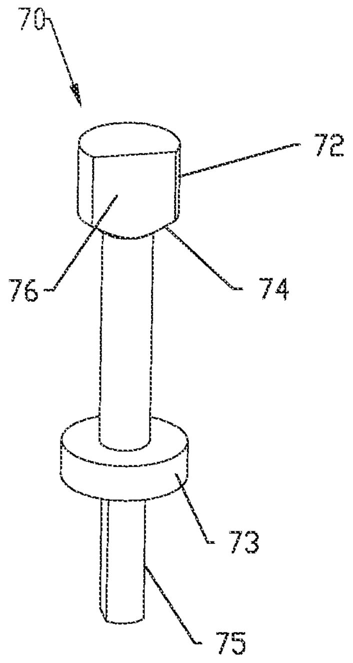
FIG. 6A is a perspective view of an exemplary cam of an exemplary padlock according to an aspect of the present invention.
Figure 6B:
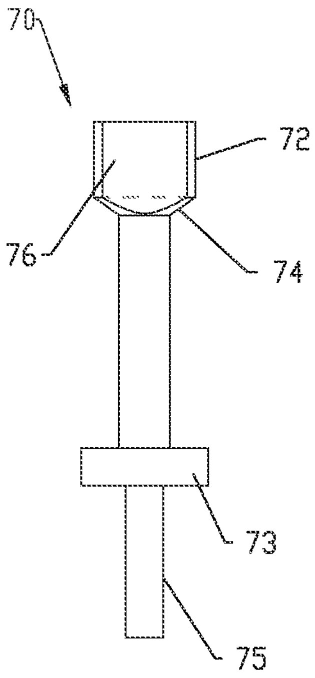
FIG. 6B is a plan view of the exemplary cam.
Figure 7:
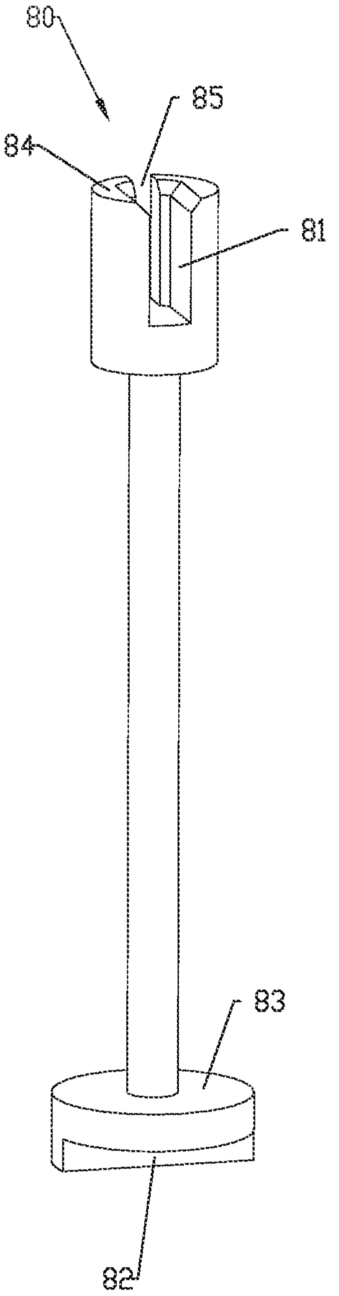
FIG. 7 is a perspective view of an exemplary extended-cam of an exemplary padlock according to an aspect of the present invention.
Figure 18A:
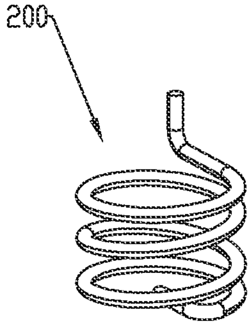
FIG. 18A is a perspective view of an exemplary torque spring of an exemplary padlock according to an aspect of the present invention.
Figure 18B:
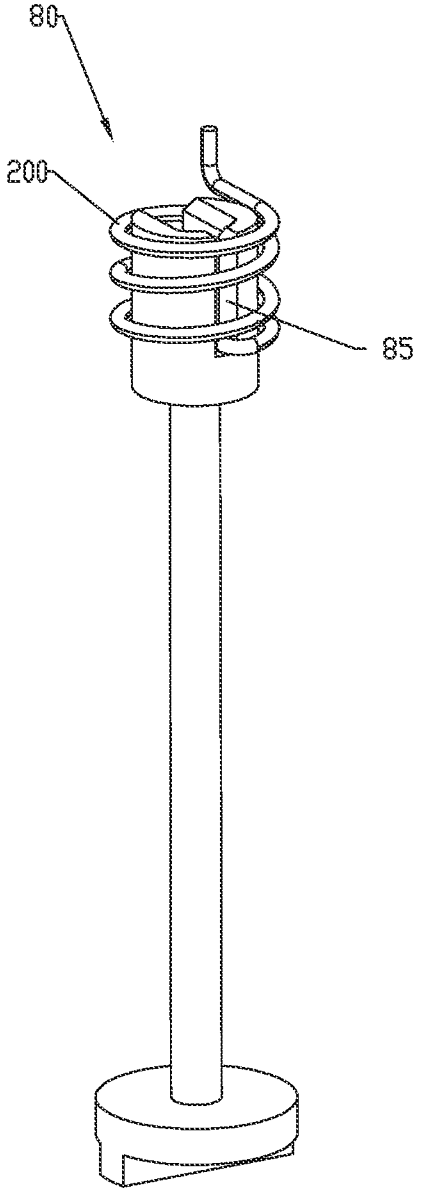
FIG. 18B is a perspective view of the exemplary torque spring placed over the torque-spring-slot of the exemplary extended-cam.
Figure 19A:
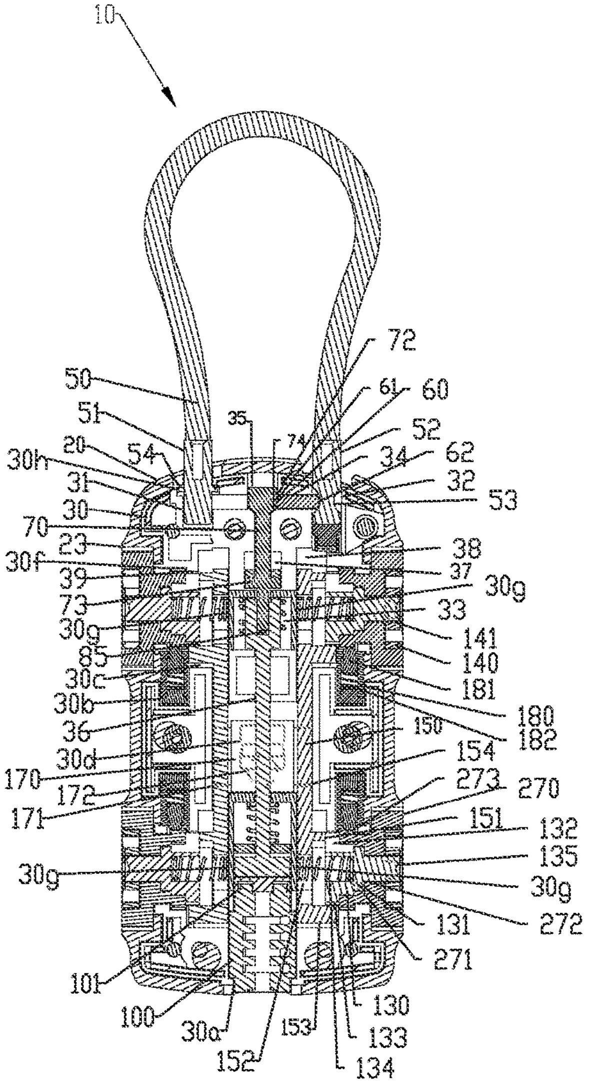
FIG. 19A is a cross-sectional view of the exemplary padlock in the direction of the base-body.
Figure 19B:
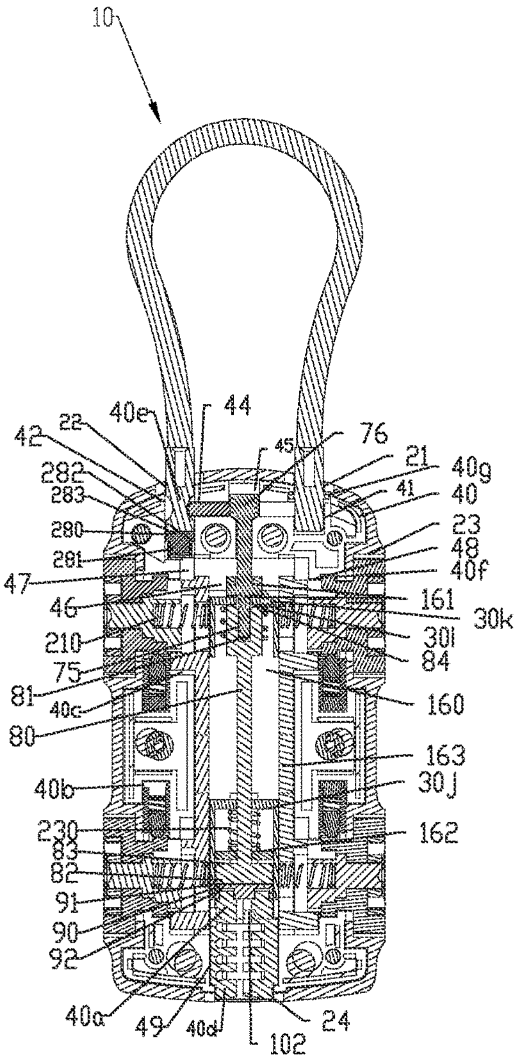
FIG. 19B is a cross-sectional view of the exemplary padlock in the direction of the interior-cover.
Figure 19C:
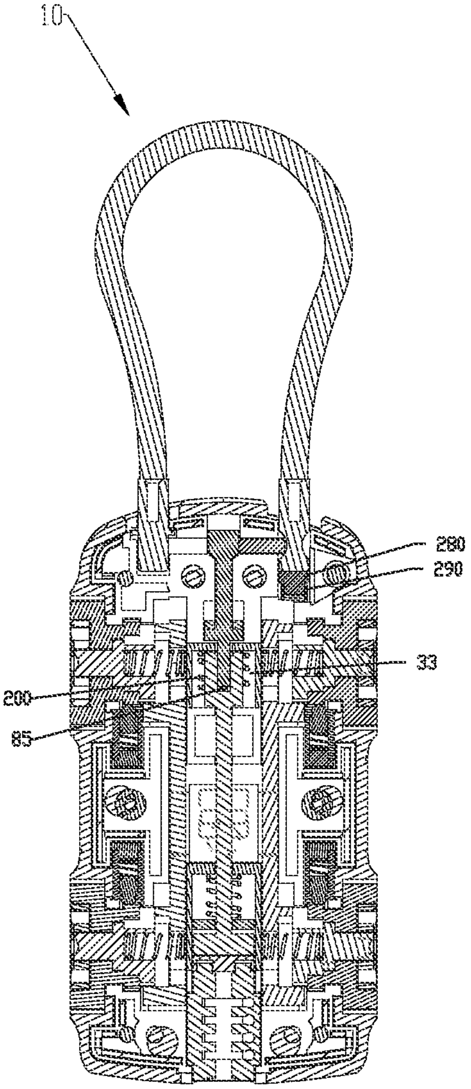
FIG. 19C is a cross-sectional view of the exemplary padlock in the direction of the base-body.
Figure 19D:
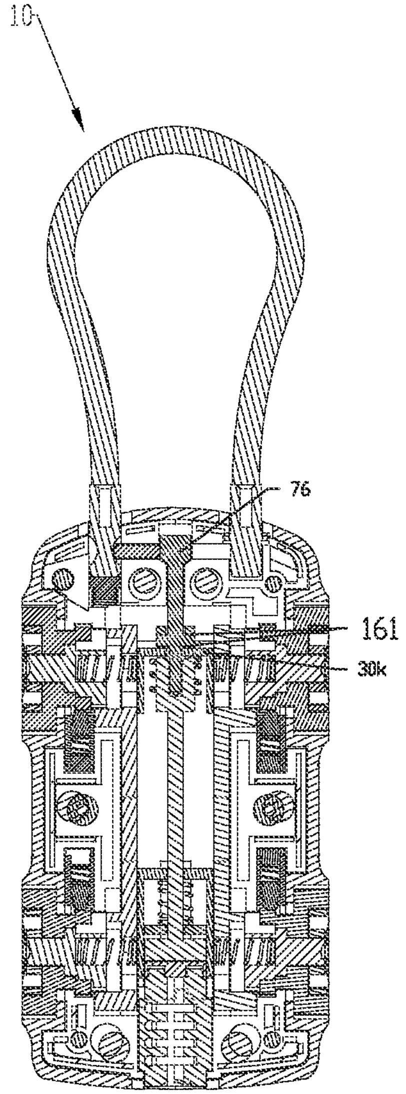
FIG. 19D is a cross-sectional view of the exemplary padlock in the direction of the interior-cover.
Figure 19E:
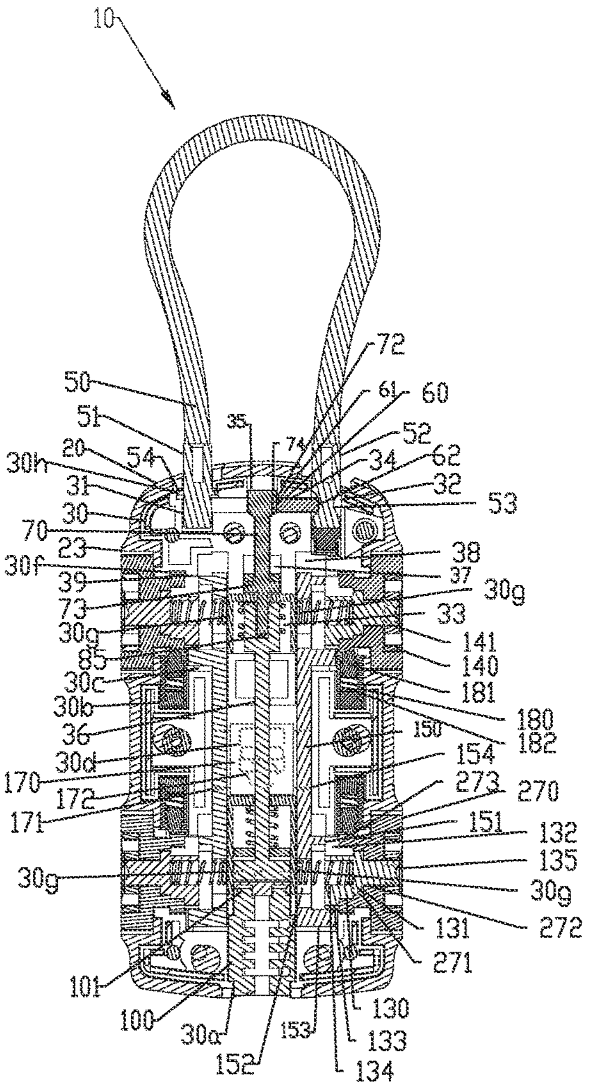
FIG. 19E is a cross-sectional view of the exemplary padlock having the alternative embodiment of the exemplary short cam in the direction of the base-body.
Figure 19F:
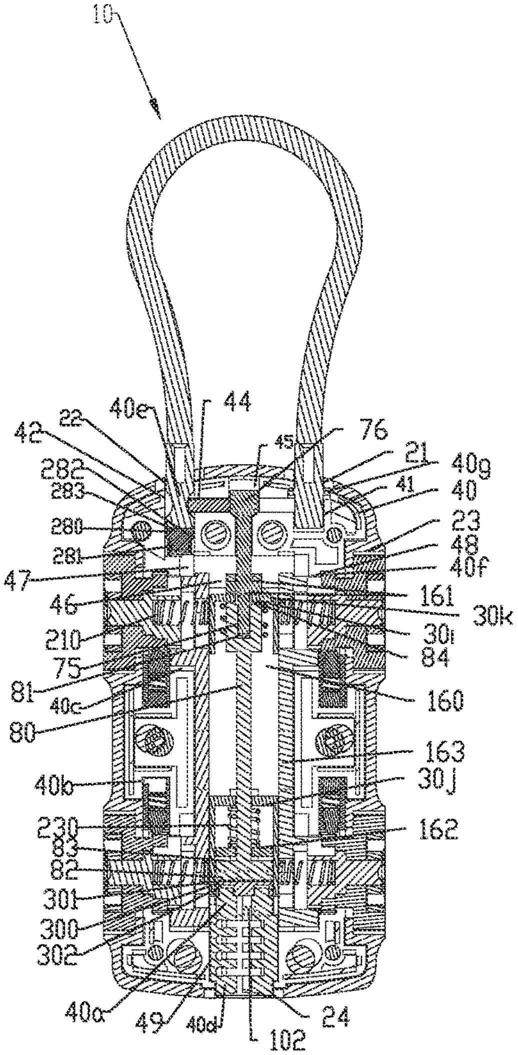
FIG. 19F is a cross-sectional view of the exemplary padlock having the alternative embodiment of the exemplary short cam in the direction of the interior-cover.
Figure 19G:
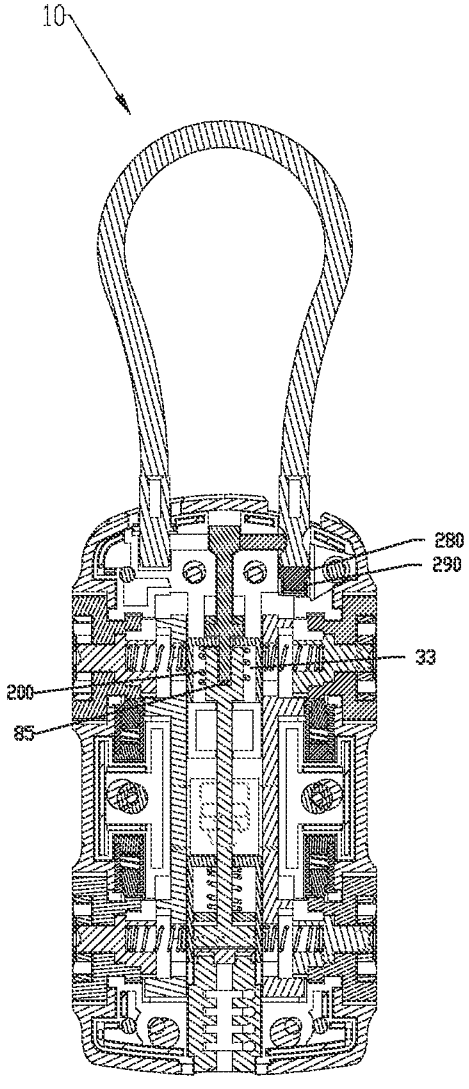
FIG. 19G is a cross-sectional view of the exemplary padlock having the alternative embodiment of the exemplary short cam in the direction of the base-body.
Figure 19H:
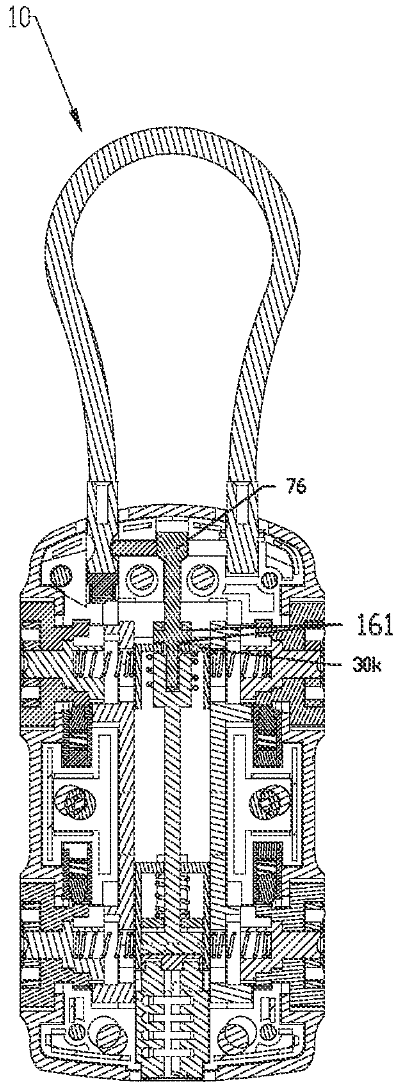
FIG. 19H is a cross-sectional view of the exemplary padlock having the alternative embodiment of the exemplary short cam in the direction of the interior-cover.
Figure 20A:
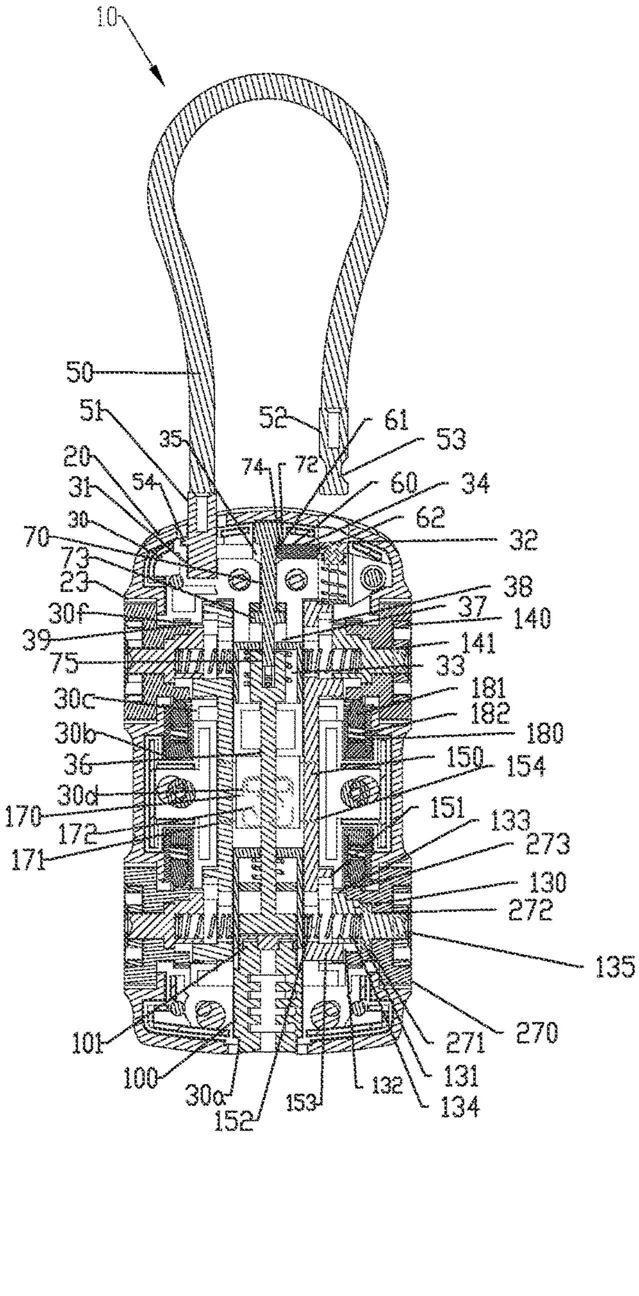
FIG. 20A is a cross-sectional view of the exemplary padlock in the direction of the base-body with the cable unlocked from the padlock.
Figure 20B:
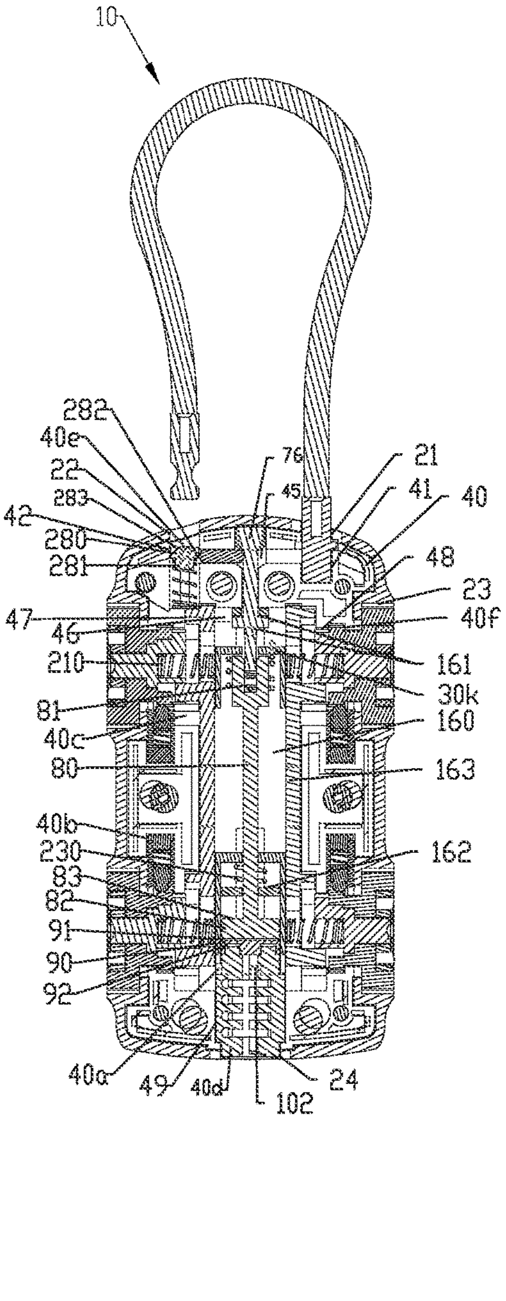
FIG. 20B is a cross-sectional view of the exemplary padlock in the direction of the interior-cover with the cable unlocked from the padlock.
Figure 20C:
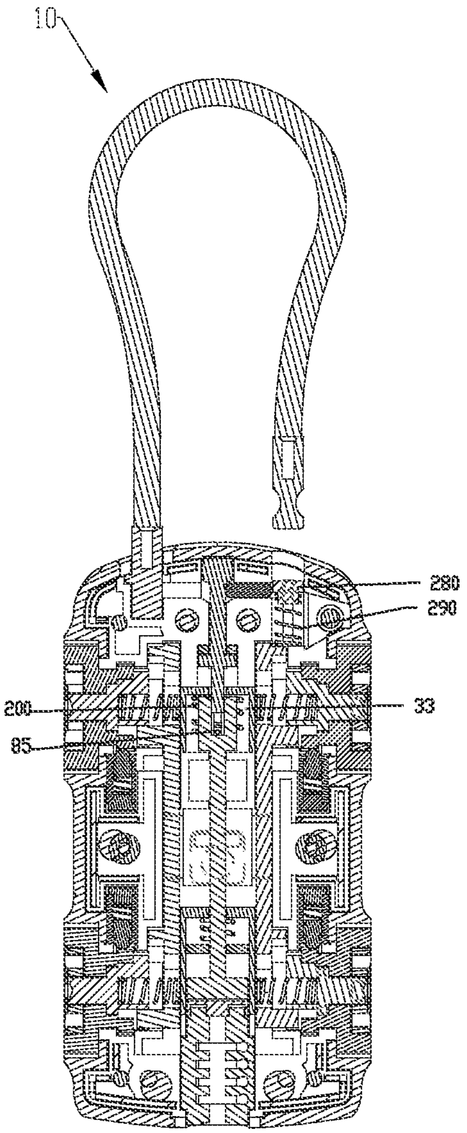
FIG. 20C is a cross-sectional view of the exemplary padlock in the direction of the base-body with the cable unlocked from the padlock.
Figure 20D:
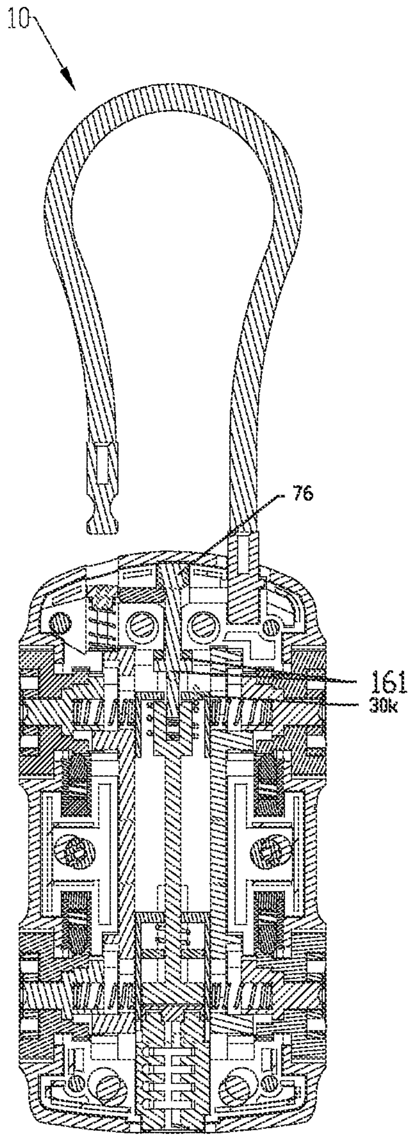
FIG. 20D is a cross-sectional view of the exemplary padlock in the direction of the interior-cover with the cable unlocked from the padlock.
Figure 20E:
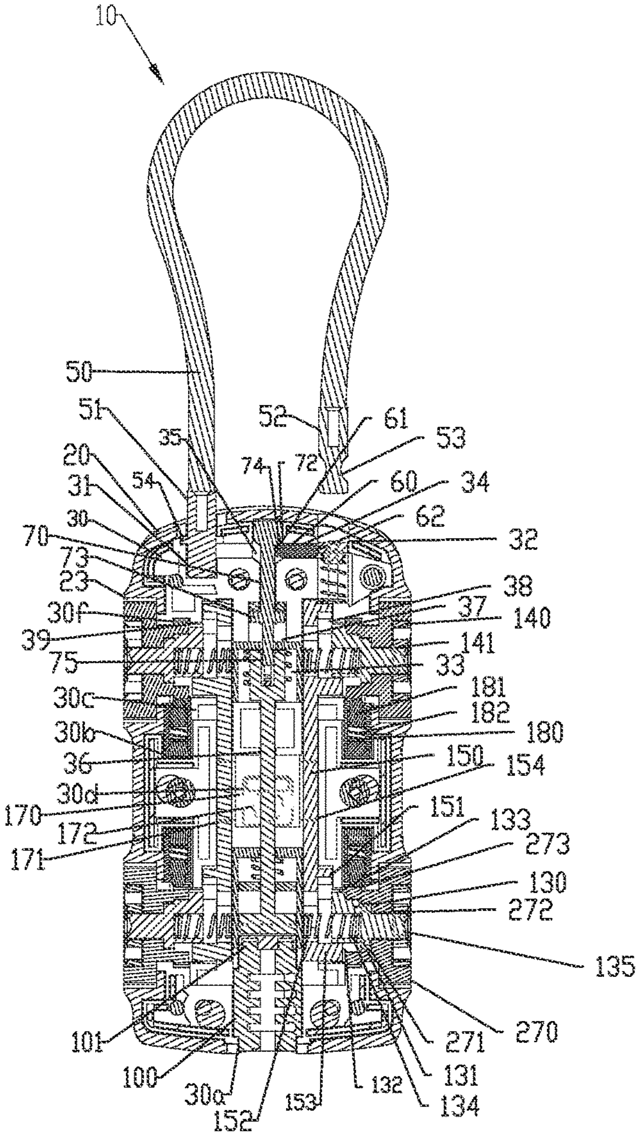
FIG. 20E is a cross-sectional view of the exemplary padlock having the alternative embodiment of the exemplary short cam in the direction of the base-body with the cable unlocked from the padlock.
Figure 20F:
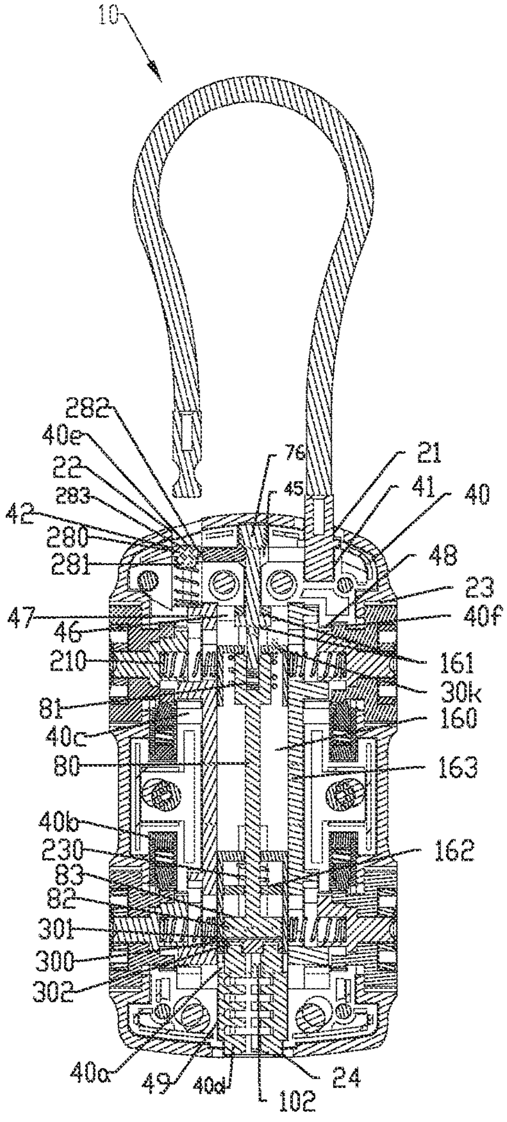
FIG. 20F is a cross-sectional view of the exemplary padlock having the alternative embodiment of the exemplary short cam in the direction of the interior-cover with the cable unlocked from the padlock.
Figure 20G:
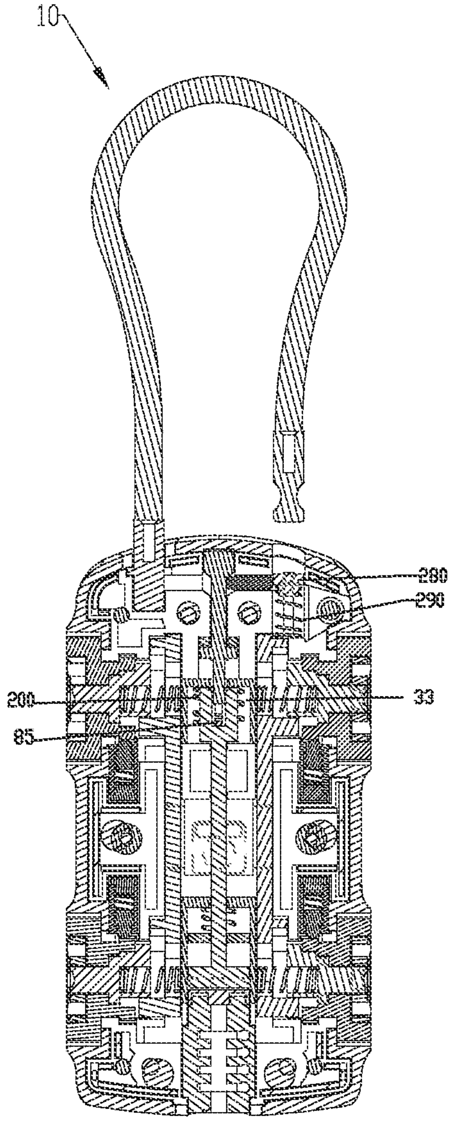
FIG. 20G is a cross-sectional view of the exemplary padlock having the alternative embodiment of the exemplary short cam in the direction of the base-body with the cable unlocked from the padlock.
Figure 20H:
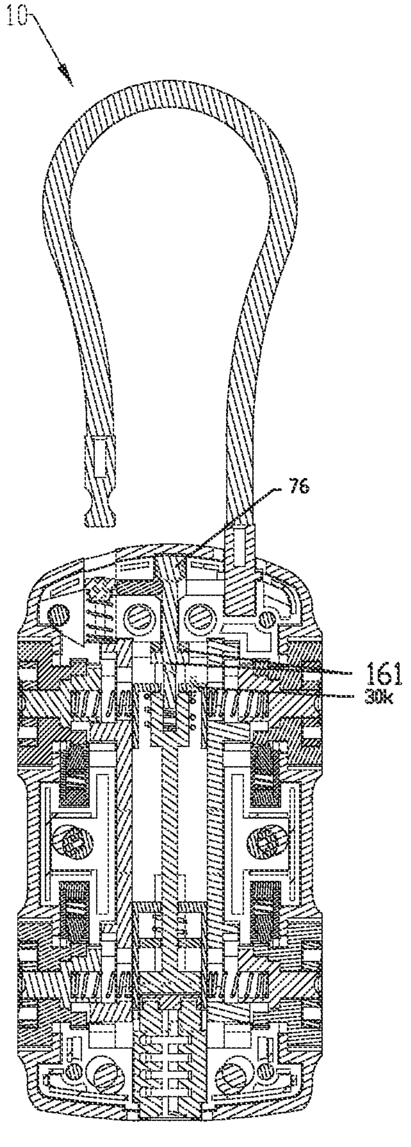
FIG. 20H is a cross-sectional view of the exemplary padlock having the alternative embodiment of the exemplary short cam in the direction of the interior-cover with the cable unlocked from the padlock.
Figure 21A:
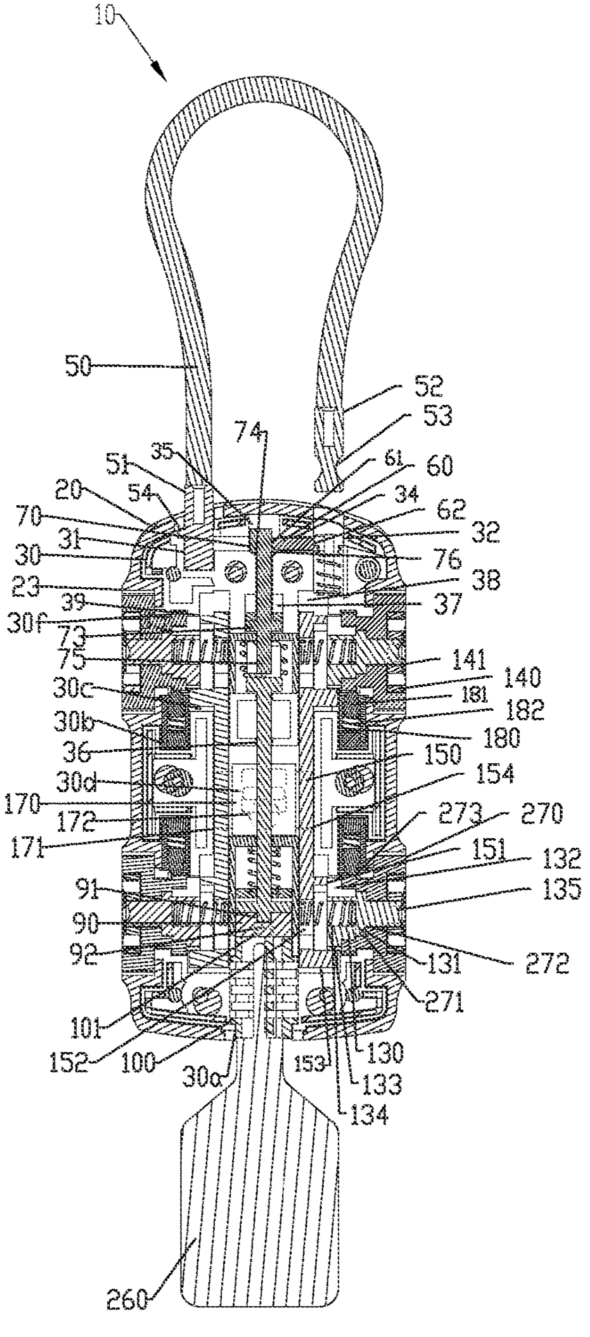
FIG. 21A is a cross-sectional view of the exemplary padlock in the direction of the base-body showing a key for unlocking the cable from the padlock.
Figure 21B:
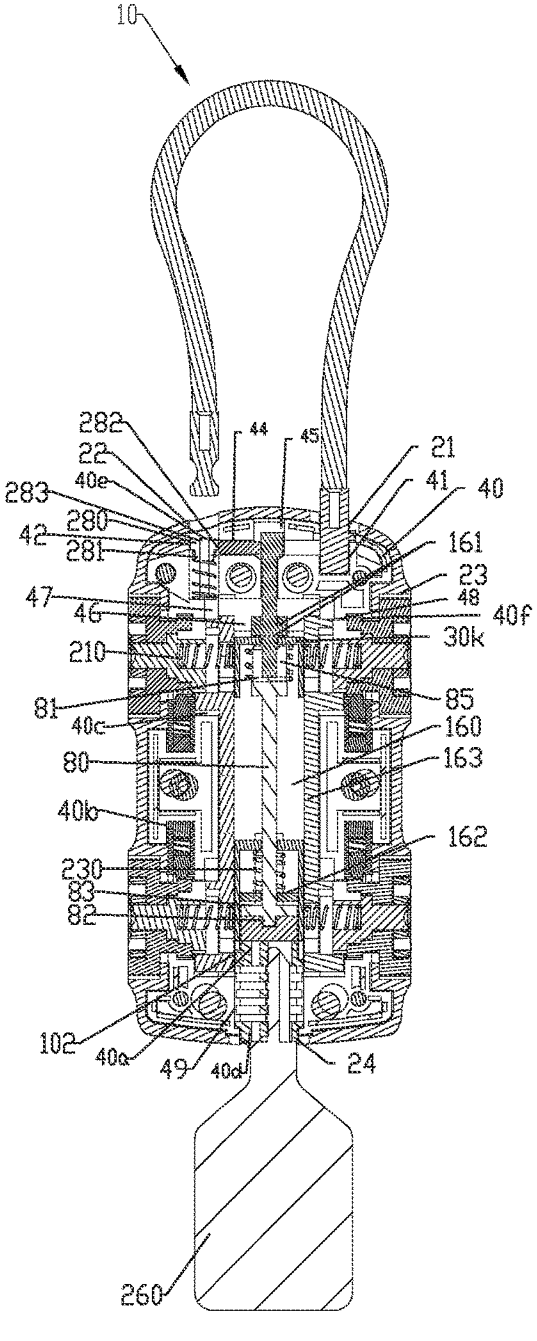
FIG. 21B is a cross-sectional view of the exemplary padlock in the direction of the interior-cover with the cable unlocked from the padlock.
Figure 21C:
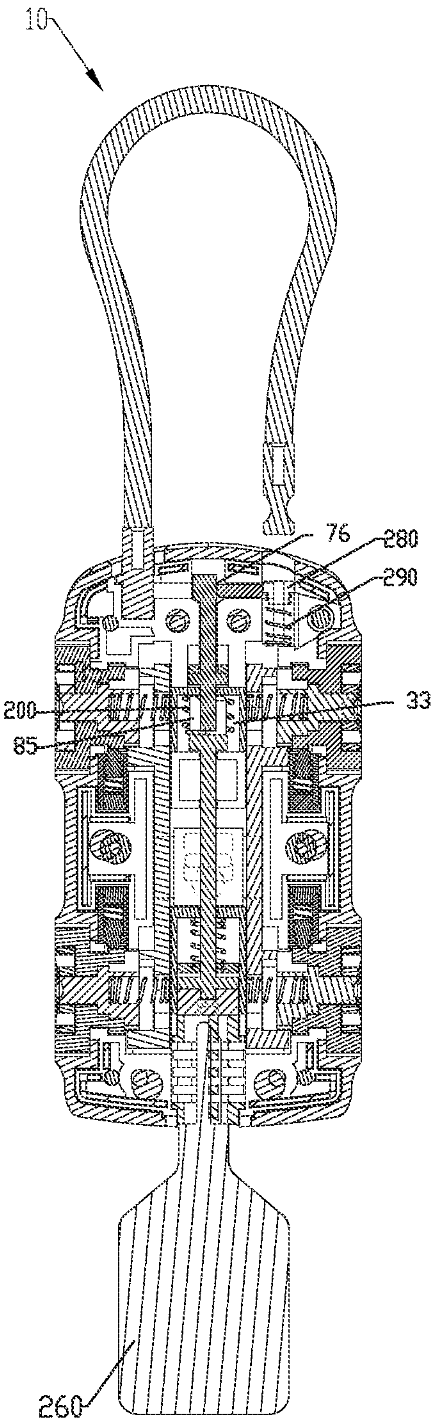
FIG. 21C is a cross-sectional view of the exemplary padlock in the direction of the base-body showing a key for unlocking the cable from the padlock.
Figure 21D:
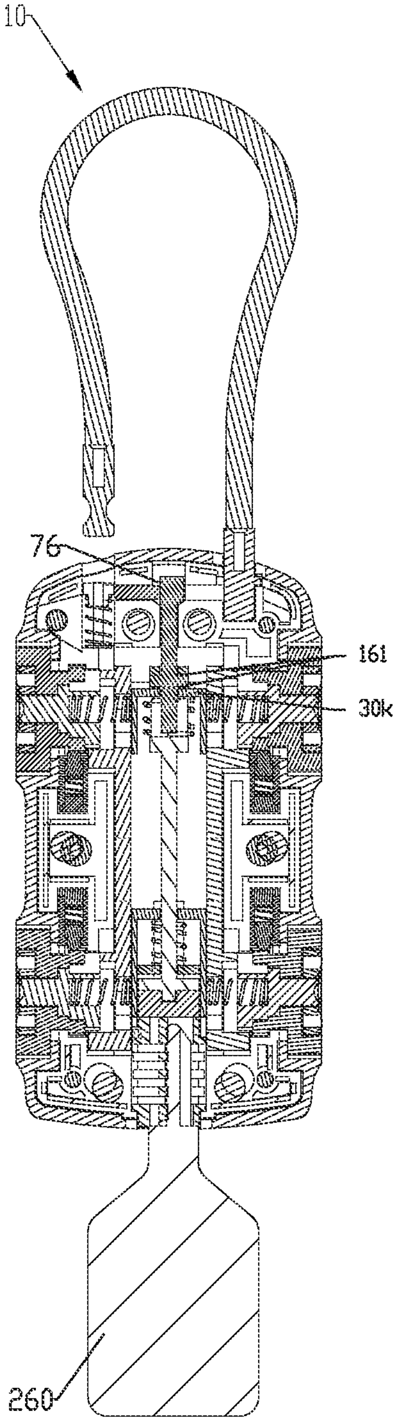
FIG. 21D is a cross-sectional view of the exemplary padlock in the direction of the interior-cover showing a key for unlocking the cable from the padlock.
Figure 21E:
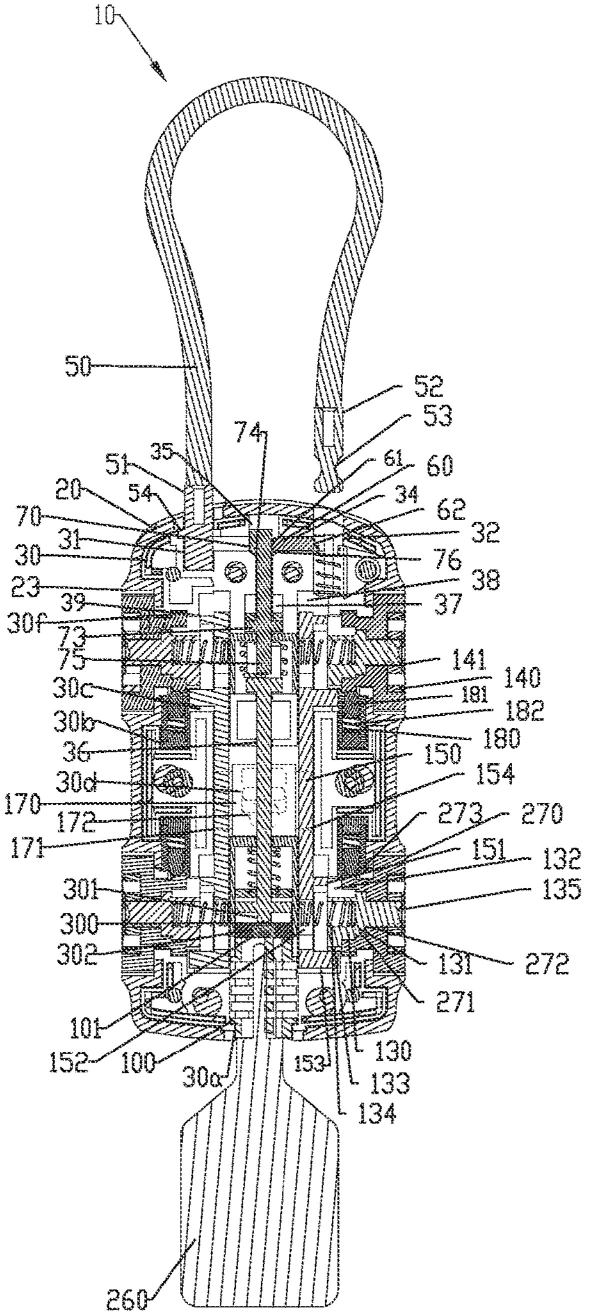
FIG. 21E is a cross-sectional view of the exemplary padlock having the alternative embodiment of the exemplary short cam in the direction of the base-body showing a key for unlocking the cable from the padlock.
Figure 21F:
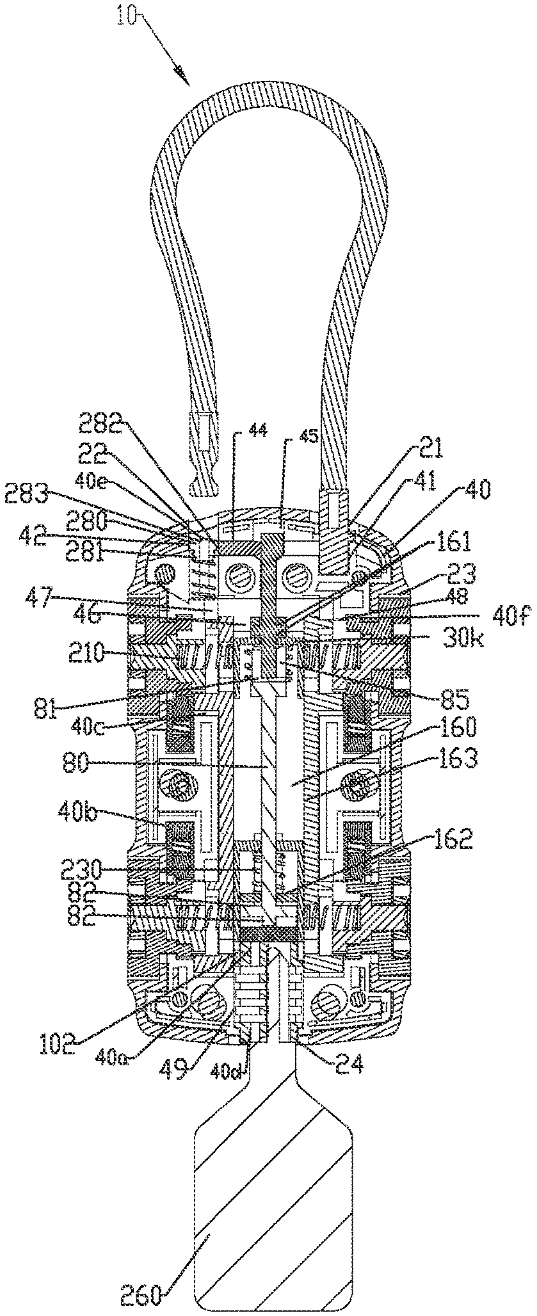
FIG. 21F is a cross-sectional view of the exemplary padlock having the alternative embodiment of the exemplary short cam in the direction of the interior-cover with the cable unlocked from the padlock.
Figure 21G:
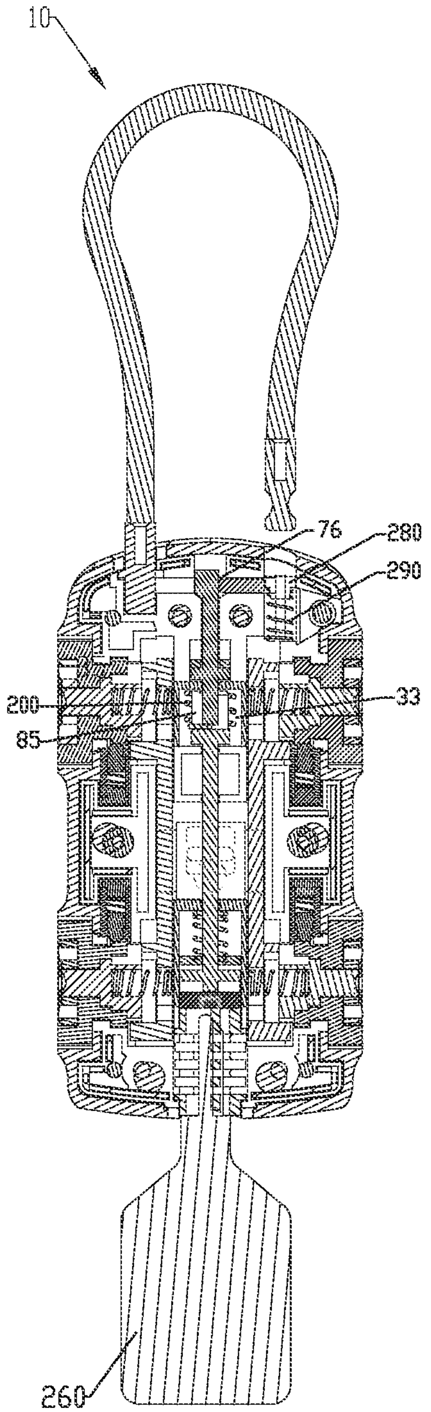
FIG. 21G is a cross-sectional view of the exemplary padlock having the alternative embodiment of the exemplary short cam in the direction of the base-body showing a key for unlocking the cable from the padlock.
Figure 21H:
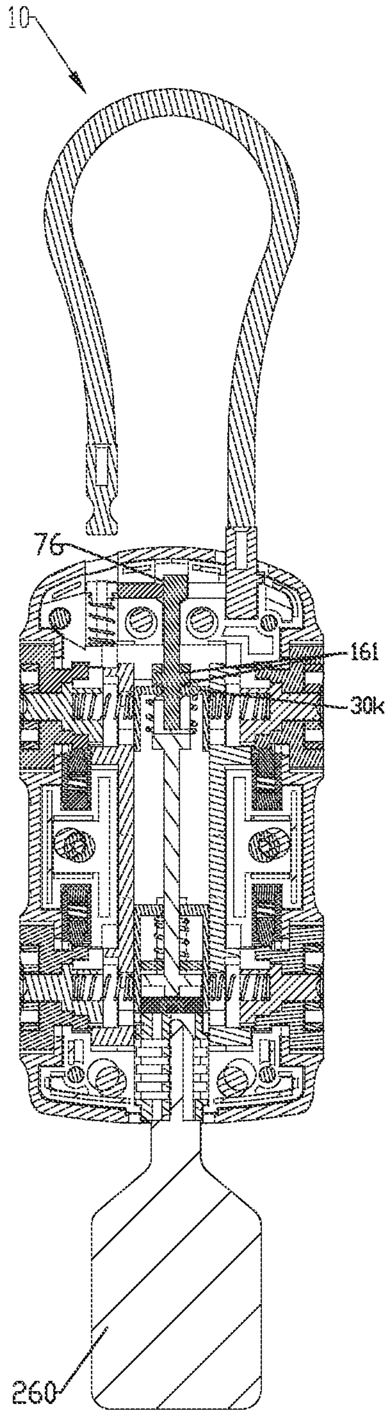
FIG. 21H is a cross-sectional view of the exemplary padlock having the alternative embodiment of the exemplary short cam in the direction of the interior-cover showing a key for unlocking the cable from the padlock.
Figure 22A:
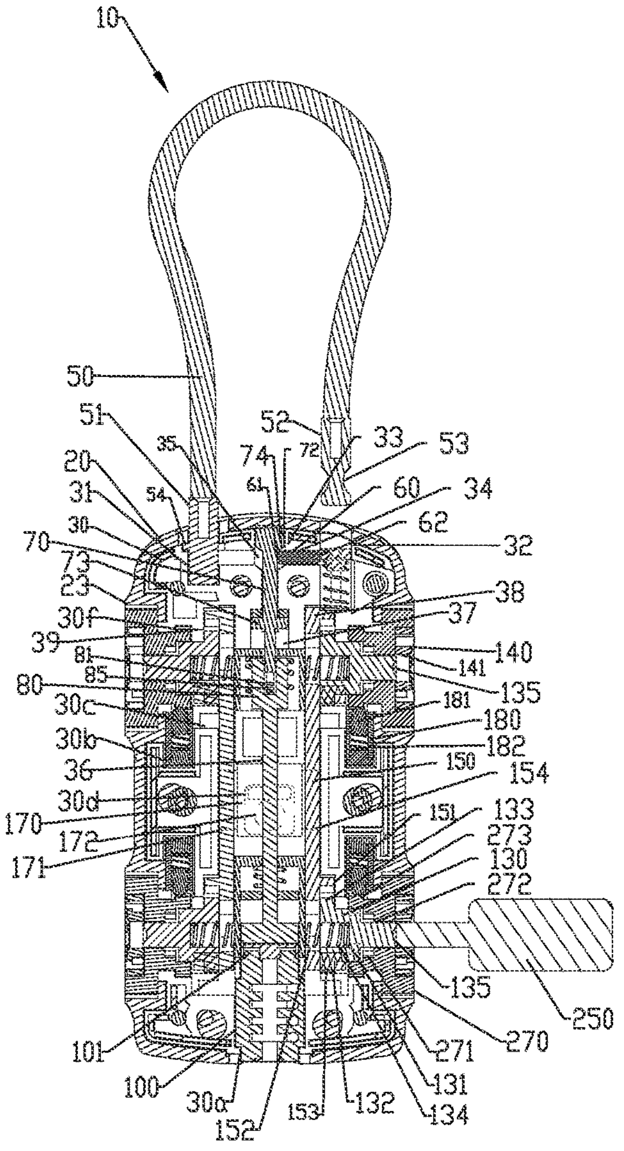
FIG. 22A is a cross-sectional view of the exemplary padlock in the direction of the base-body showing a reset tool inserted into the padlock.
Figure 22B:
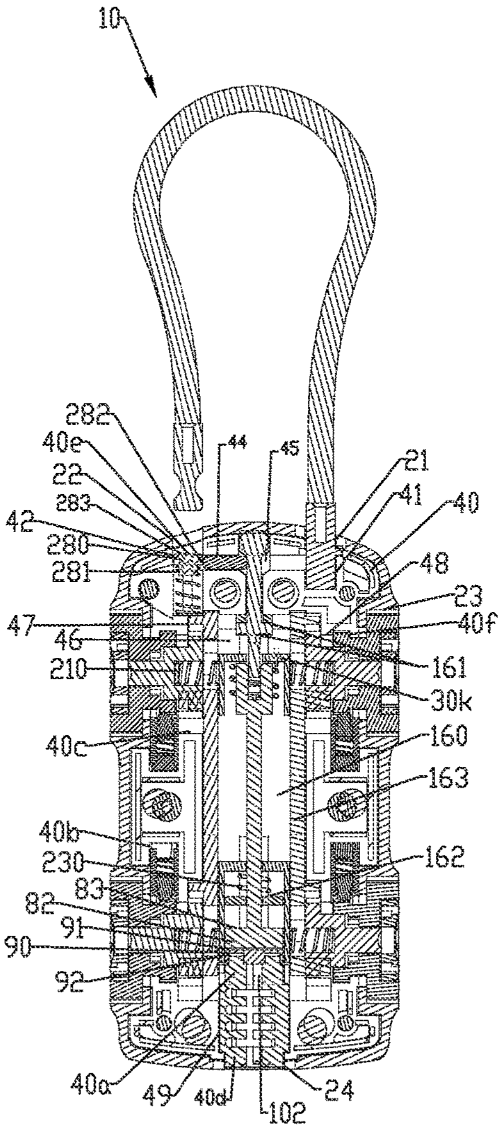
FIG. 22B is a cross-sectional view of the exemplary padlock in the direction of the interior-cover with the cable released from the padlock.
Figure 22C:
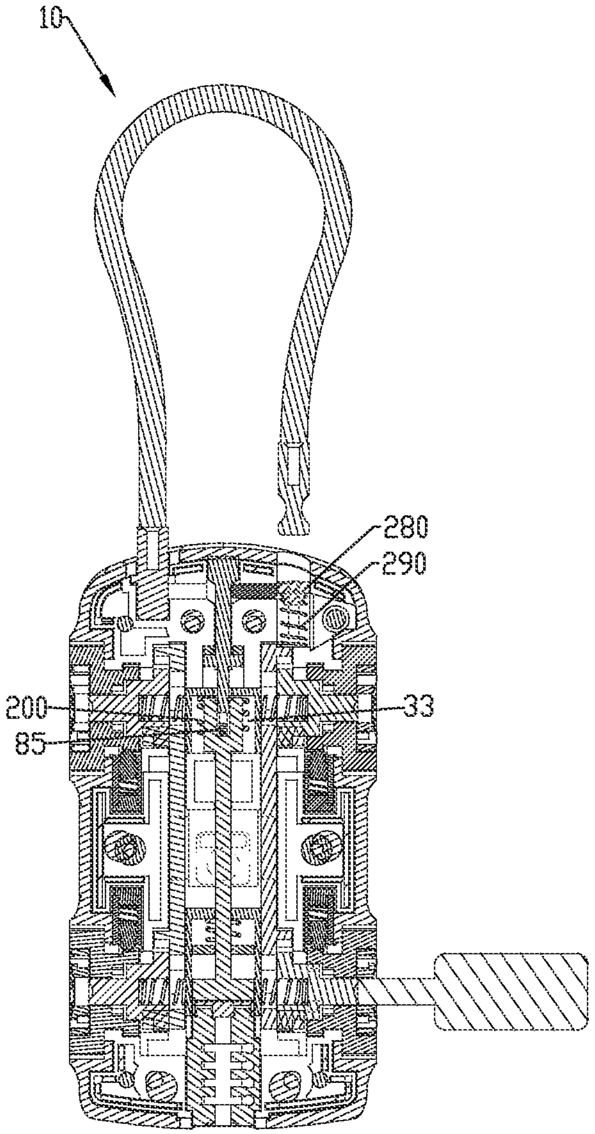
FIG. 22C is a cross-sectional view of the exemplary padlock in the direction of the base-body showing a reset tool inserted into the padlock.
Figure 22D:
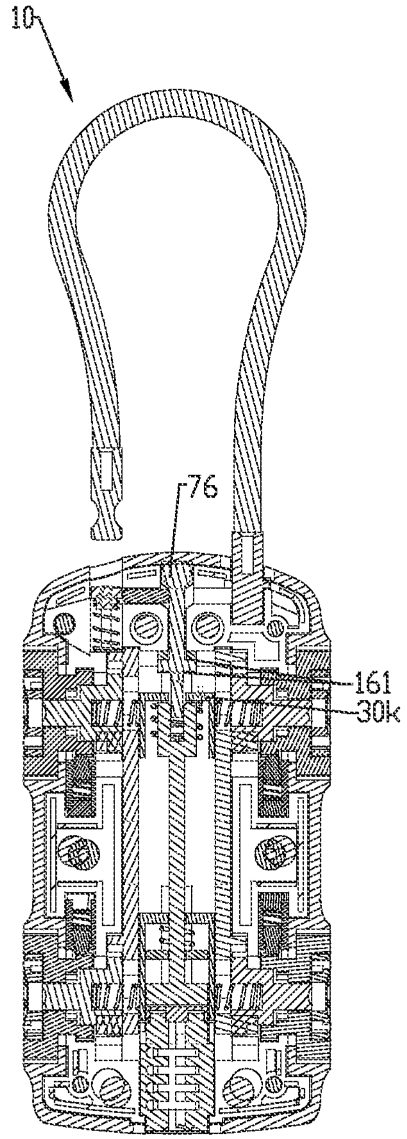
FIG. 22D is a cross-sectional view of the exemplary padlock in the direction of the interior-cover with the cable released from the padlock.
Figure 22E:
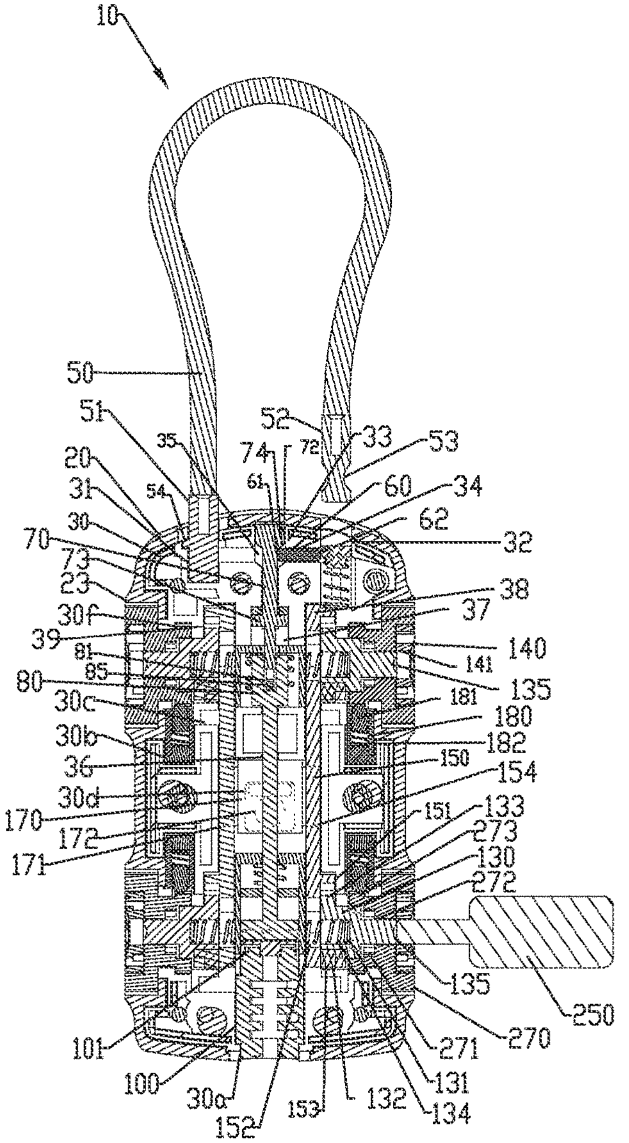
FIG. 22E is a cross-sectional view of the exemplary padlock having the alternative embodiment of the exemplary short cam in the direction of the base-body showing a reset tool inserted into the padlock.
Figure 22F:
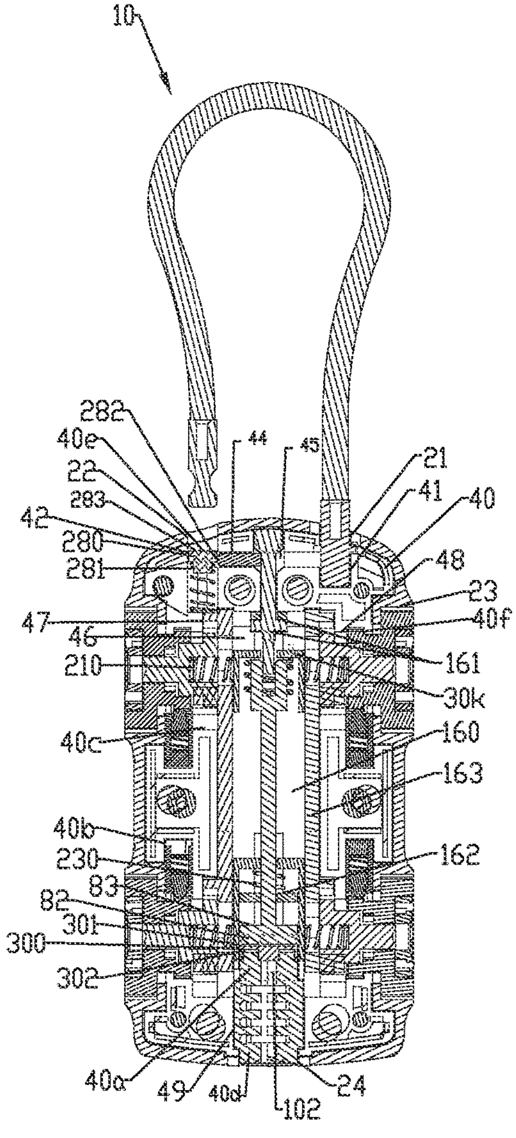
FIG. 22F is a cross-sectional view of the exemplary padlock having the alternative embodiment of the exemplary short cam in the direction of the interior-cover with the cable released from the padlock.
Figure 22G:
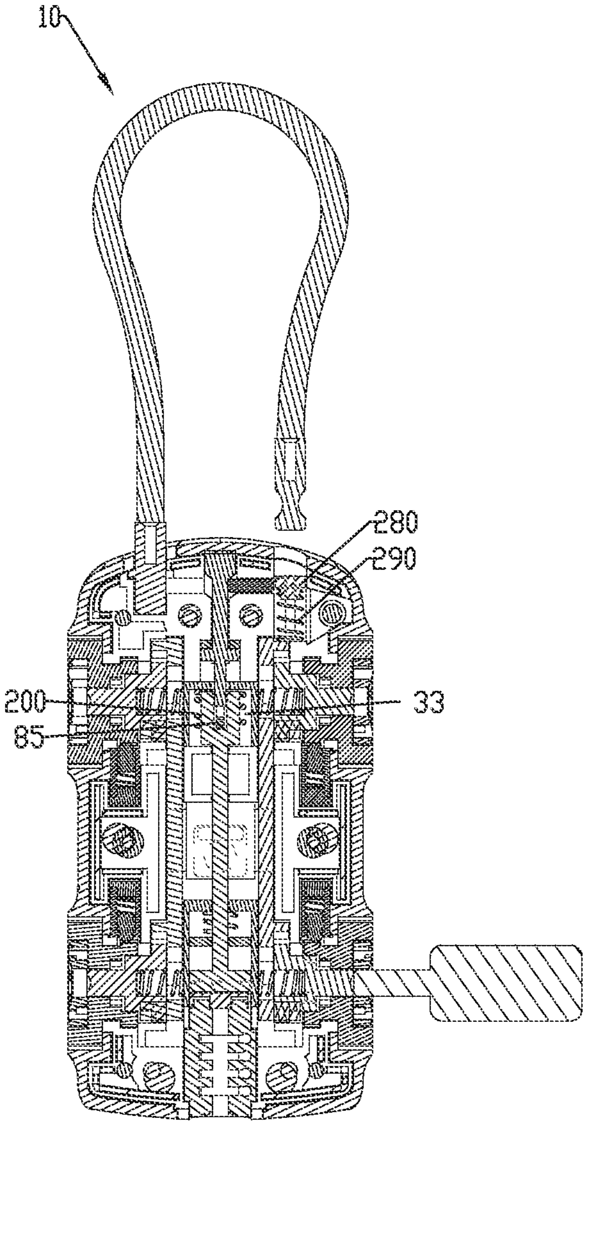
FIG. 22G is a cross-sectional view of the exemplary padlock having the alternative embodiment of the exemplary short cam in the direction of the base-body showing a reset tool inserted into the padlock.
Figure 22H:
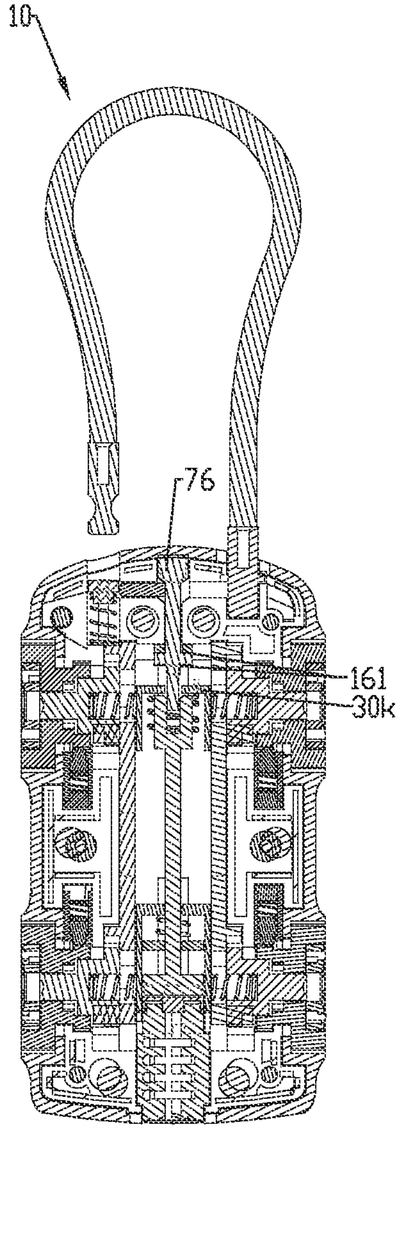
FIG. 22H is a cross-sectional view of the exemplary padlock having the alternative embodiment of the exemplary short cam in the direction of the interior-cover with the cable released from the padlock.
Figure 23:
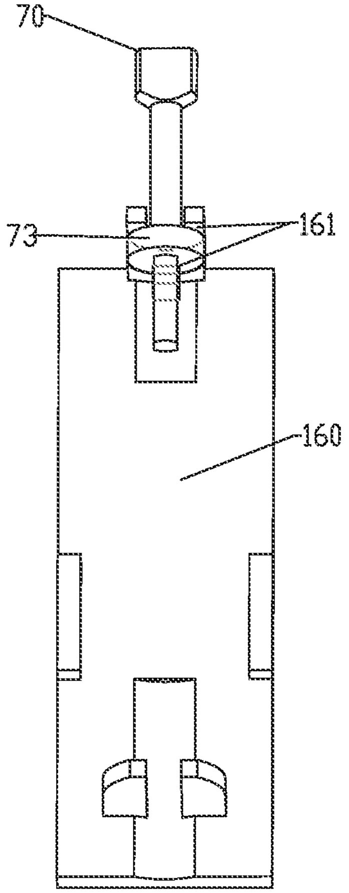
FIG. 23 is a perspective view of the exemplary connected plate and exemplary cam.
Figure 24A:
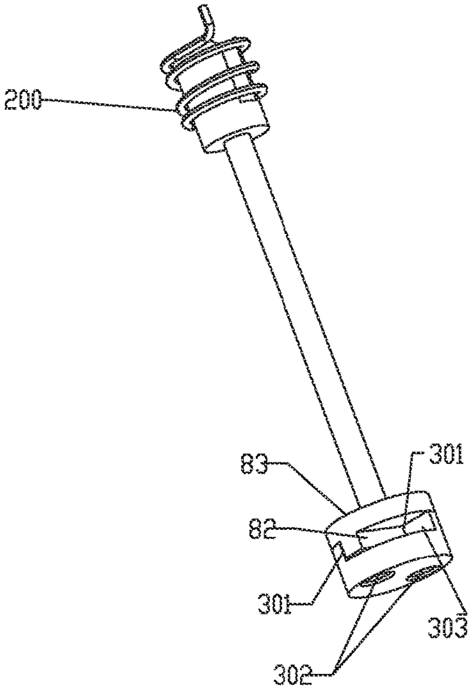
FIG. 24A is a perspective view of engagement between the exemplary extended-cam and exemplary short-cam in the locked position.
Figure 24B:
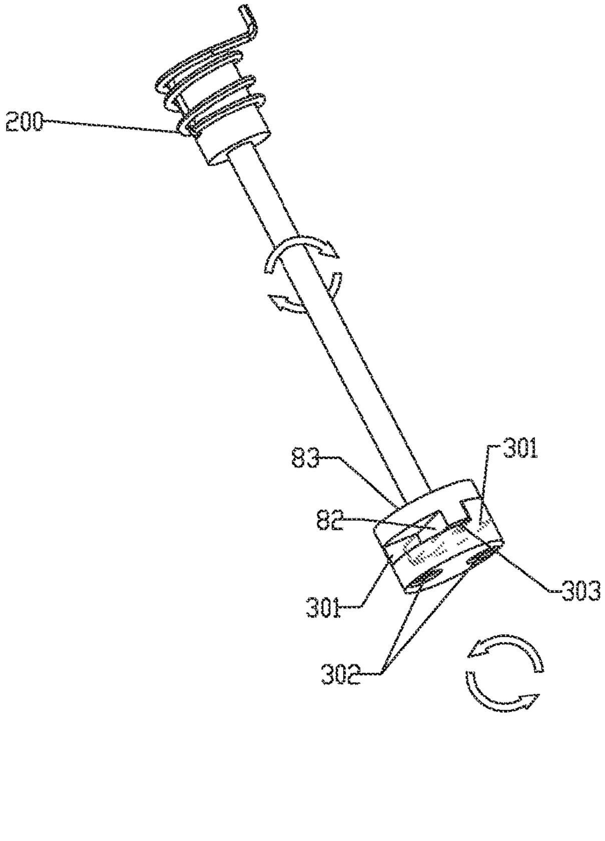
FIG. 24B is a perspective view of the exemplary extended-cam and exemplary short-cam demonstrating the non-captive key design.

Referring now to FIGS. 1, 1A and 2-4, therein illustrated is an exemplary padlock, generally indicated by reference numeral 10 in FIG. 1A. The exemplary padlock 10 may include an external cover 20 configured to form at least a partial enclosure for the components of the padlock 10. The external cover 20 may include a fixed-end hole 21 formed in the perimeter of the external cover 20, and a flexible-end hole 22 also formed in the perimeter of the external cover 20 and positioned substantially adjacent to the fixed-end hole 21. The external cover 20 may also include one or more dial-cutouts 23 formed in the perimeter of the external cover 20, and a cylinder-cutout 24, which may be positioned on a side of the external cover 20 opposite the fixed-end hole 21 and/or flexible end hole 22. The padlock 10 may also include a base-body 30 configured for engagement with the external cover 20 to form at least a partial enclosure for the components of the padlock 10. The base-body 30 may include a fixed-end hole 31 formed therein, and positioned in the base-body 30 to be opposite the fixed-end hole 21 of the external cover 20 when the base-body 30 is engaged with the external cover 20. The base-body 30 may also include a flexible-end hole 32 formed therein, and positioned in the base-body 30 to be opposite the flexible-end hole 22 of the external cover 20 when the base-body 30 is engaged with the external cover 20. The base-body 30 may also include a torque-spring slot 33 formed therein that is configured and dimensioned to receive a torque spring 200 (FIG. 18A). The base-body 30 may also include a bolt-slot 34 formed therein, and the bolt-slot 34 may be configured to at least partially intersect with either or both the fixed-end hole 31 and/or flexible-end hole 32. The base-body 30 may further include a locking-cam slot 35, which may be positioned between the fixed-end hole 31 and the flexible-end hole 32. The base-body 30 may also include an extended-cam slot 36, which may be formed in the base-body 30 substantially in-line with the locking-cam slot 35. A connected-plate slot 37 may be positioned in the base-body 30 between the extended-cam slot 36 and the locking-cam slot 35. The base-body 30 may further include at least one control-plate slot 38 and at least one clutch-slot 39 positioned substantially adjacent to each control-plate slot 38. The base-body 30 may also include a cylinder-slot 30*a*, which is positioned in the base-body 30 to be opposite the cylinder-cutout 24 of the external cover 20 when the base-body 30 is engaged with the external cover 20. The base-body 30 may further include at least one ratchet-pin slot 30*b*, and at least one extended-pin slot 30*c*. The base-body 30 may also have a button-slot 30*d* formed therein to provide an opening in the base-body 30. The base-body 30 may also include a spring-loaded member slot 30*e*, which may be formed so as to at least partially intersect the flexible-end hole 32. The base-body 30 may also include at least one inner-wheel slot 30*f*, and at least one clutch-spring wall 30*g*, which may be positioned on opposite sides of each of the clutch slots 39. The base-body 30 may have a wing-slot 30*h* formed therein adjacent to the fixed-end hole 31. The base-body 30 may also have a cam stop wall 30*i* and a torque-spring tail slot 30*k* formed therein. The base-body 30 may further include an extended-cam spring wall 30*j*.

Still referring to FIGS. 1, 1A and 2-4, the padlock 10 may also include an interior-cover 40 configured to be received within the external cover 20 and engaged opposite the base-body 30. The interior-cover 40 may include a fixed-end hole 41 configured to align with the fixed-end hole 21 of the external cover 20, and the fixed-end hole 31 of the base-body 31 so as to form an opening for a fixed-end 51 of a cable 50 of the padlock 10. Likewise, the interior-cover 40 may include a flexible-end hole 42 configured to align with the flexible-end hole 22 of the external cover 20 and the flexible-end hole 32 of the base-body 30 so as to form an opening for a flexible-end 52 of the cable 50. A wing slot 40*g* may be formed in the interior-cover 40 adjacent to the fixed-end hole 41 in order to receive and retain a wing 54 of the fixed-end 51 of the cable 50 within the padlock 10. Once this is in place, the fixed-end 51 of the cable 50 cannot move away from the fixed-end-hole 21/31/41 of the external-cover 20/base-body 30/and interior cover 40 in any mode. The interior-cover 40 may further include a bolt slot 44 at least partially intersecting the flexible-end hole 42, and configured to align with the bolt slot 34 of the base-body 30 to provide a channel. Likewise, the interior-cover 40 may include a locking-cam slot 45, extended-cam slot 46, control plate-slot 47, clutch-slot 48, cylinder slot 49, ratchet-pin slot 40*b*, extended-pin slot 40*c*, spring-loaded member slot 40*e* and inner-wheel slot 40*f* configured to align with the corresponding element of the base-body 30 when the interior-cover 40 is connected to the base-body 30 to provide a channel and/or cavity for at least partially housing of one or more internal components of the padlock 10. The cylinder-slot 49 of the interior-cover 40 may also include a cylinder-turning angle control slot 40*a* and a wafer-strengthen plate slot 40*d*. The cable 50 may also include a bolt-receiving cutout 53 formed in the flexible-end 52, and configured for positioning relative to the bolt-slot 34/44 when the flexible-end 52 of the cable 50 is inserted into the padlock 10.

Referring now to FIGS. 5, 6A-6B, 7 and FIGS. 19A-19H, the padlock 10 may also include a bolt 60, a cam 70 and an extended-cam 80. The bolt 60 may include a flat-end 61 and a round-end 62. The cam 70 may include a lock-surface 72 configured for engagement with the flat-end 61 of the bolt 60 when the padlock 10 is in a locked mode, and a flat-side 76 configured for engagement with the flat-end 61 of the bolt 60 when the padlock 10 is in an unlocked mode by the key mechanism. The cam 70 may also include a slope 74 configured for engagement with the flat-end 61 of the bolt 60 when the padlock 10 is in the unlocked mode by the combination mechanism. The cam 70 may further include an extended radius 73 having a diameter larger than the remainder of the cam 70, and a tail 75 extending from the extended radius 73. The extended-cam 80 may include a pass-way 81 formed in a top end 84 thereof, and a slot 82 formed in the other end of the extended-cam 80. The tail 75 of the cam 70 is configured for at least partial insertion into the pass way 81 of the extended-cam 80. The extended-cam 80 may also include a wall 83 formed at an end of the extended-cam 80 opposite the top end 84, in which the slot 82 is formed. The extended-cam 80 may further include a torque-spring slot 85 formed in the top end 84 and positioned substantially adjacent to the pass-way 81. The torque-spring-slot 85 of the cam 80 is configured to connect one end of the torque spring 200 to let the torque spring 200 rotate the extended-cam 80 to the locked mode position all the time. The other end of the torque spring 200 will be inserted in the torque-spring-tail-slot 30*k* of the base body 30 to make the extended-cam 80 have a turning torque back to the locked mode position. The base body 30 will have a torque-spring-slot 33 with a yield area to put the assembled extended-cam 80 and the 200 torque-spring.

Figure 8A:
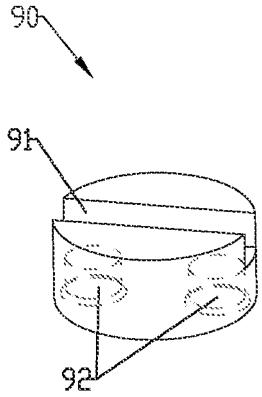
FIG. 8A is a perspective view of an exemplary short cam of an exemplary padlock according to an aspect of the present invention.
Figure 8B:
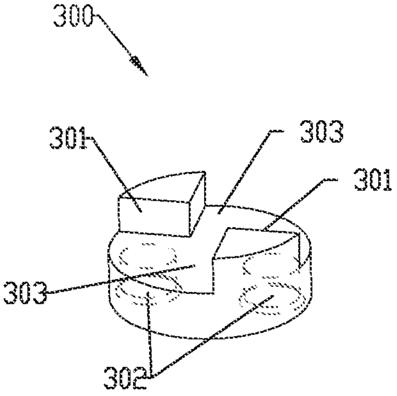
FIG. 8B is a perspective view of an alternative embodiment of an exemplary short cam of an exemplary padlock according to an aspect of the present invention.
Figure 9:
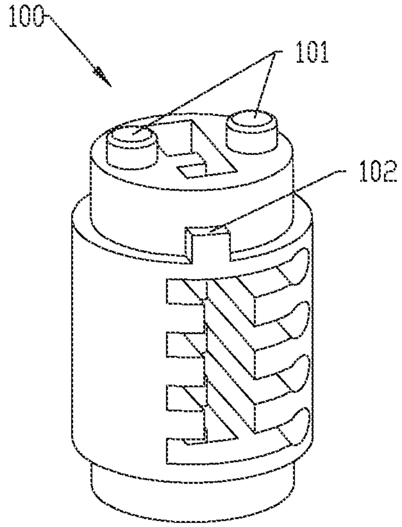
FIG. 9 is a perspective view of an exemplary cylinder of an exemplary padlock according to an aspect of the present invention.
Figure 10A:
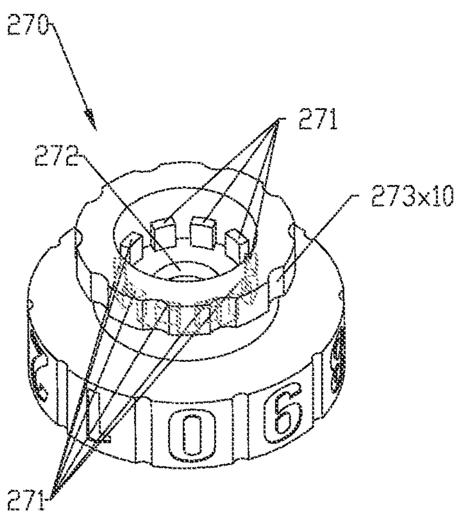
FIG. 10A is a bottom perspective view of an exemplary combined-dial of an exemplary padlock according to an aspect of the present invention.
Figure 10B:
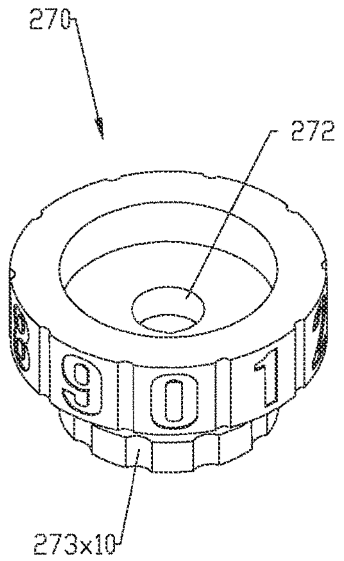
FIG. 10B is top perspective view of the exemplary combined-dial.
Figure 11A:
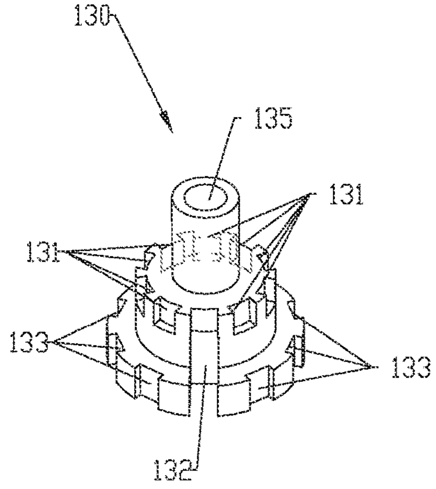
FIG. 11A is a bottom perspective view of an exemplary clutch of an exemplary padlock according to an aspect of the present invention.
Figure 11B:
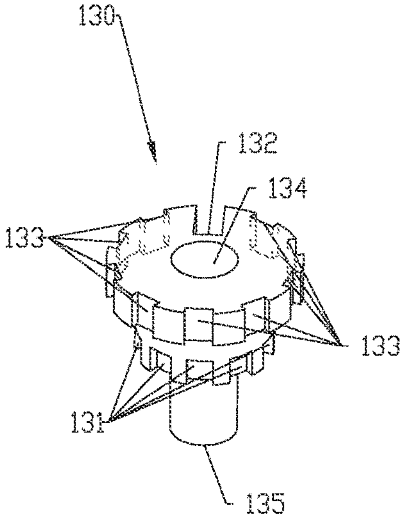
FIG. 11B is a top perspective view of the exemplary clutch.
Figure 12:
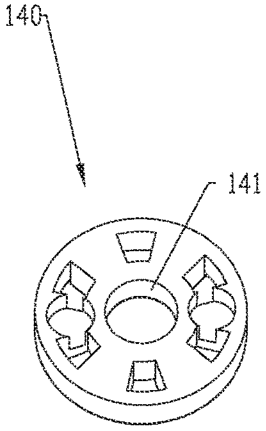
FIG. 12 is a perspective view of an exemplary wheel cover of an exemplary padlock according to an aspect of the present invention.
Figure 13:
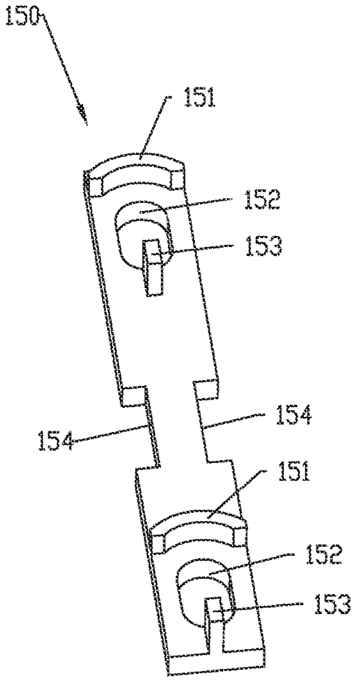
FIG. 13 is a perspective view of an exemplary control plate of an exemplary padlock according to an aspect of the present invention.
Figure 14:
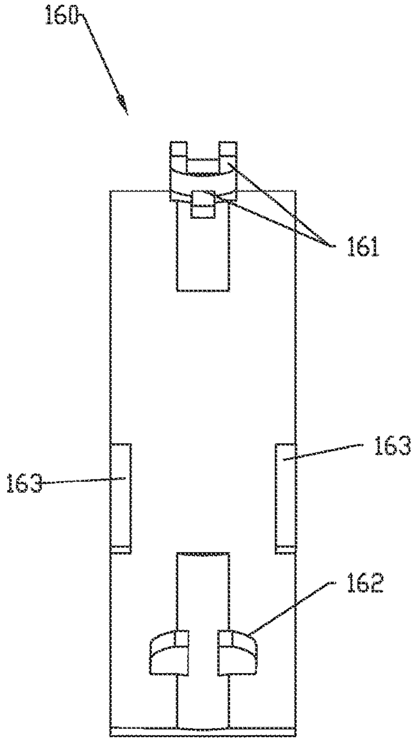
FIG. 14 is a perspective view of an exemplary connected plate of an exemplary padlock according to an aspect of the present invention.
Figure 15:
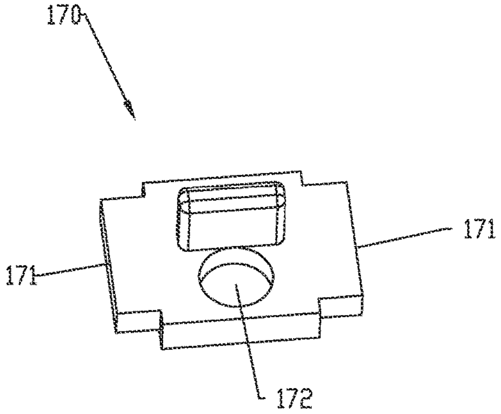
FIG. 15 is a perspective view of an exemplary button of an exemplary padlock according to an aspect of the present invention.
Figure 16:
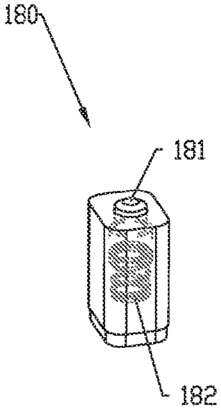
FIG. 16 is a perspective view of an exemplary ratchet-pin-holder of an exemplary padlock according to an aspect of the present invention.
Figure 17:
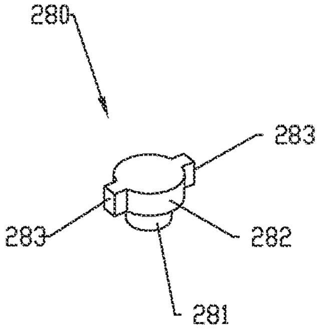
FIG. 17 is a perspective view of an exemplary rod of an exemplary padlock according to an aspect of the present invention.

Referring now to FIGS. 8A-8B and FIGS. 19A-19H, the exemplary embodiments of short-cams that may be used with the padlock 10 according to the present invention will now be discussed. As shown in FIG. 8A, a short-cam 90 may include a slot 91 configured for operative engagement with the slot 82 of the extended-cam 80. The short-cam 90 may also include one or more holes 92 configured for operative engagement with a cylinder 100 of the padlock 10. As shown in FIG. 8B, an alternative embodiment of a short-cam 300 may include one or more surfaces 301 configured for operative engagement with the slot 82 of the extended-cam 80. Positioned adjacent to each of the one or more surfaces 301 may be a free-rotate area 303 that allows for rotation of the cylinder 100 without transfer of rotation from the short-cam 300 to the extended-cam 80. The short-cam 300 may also include one or more holes 302 configured for operative engagement with the cylinder 100 of the padlock 10.

Referring now to FIGS. 9, 10A, 10B, 11A, 11B, 12 and FIGS. 19A-19H, the padlock 10 may also include the cylinder 100, which may be configured and dimensioned for receipt and retention within the cylinder-slot 30*a*/49. The cylinder 100 may be any suitable lock cylinder operated by a key, for example, a pin tumbler cylinder or a wafer cylinder. The cylinder 100 may be controlled by a stack of wafers, so that when a correct cut key 260 is not present, the stack of wafers extend outward and in contact with the wafer-strengthen plate slot 40*d* to inhibit the cylinder 100 from turning and operating the padlock 10 to the unlocked mode. The cylinder 100 may alternatively be a pin-tumbler cylinder or any other locking mechanism operated by a key or a key-like device. The cylinder 100 may include one or more pins 101 extending from a surface of the cylinder 100 that may be opposite the surface in which the correct cut key 260 may be inserted. The cylinder 100 may also include an angle control member 102 protruding from the cylinder 100. The top-end 84 of the extended-cam 80 is placed below the cam-stop wall 30*i* of the base-body 30. The extended-cam 80 contains a slot 82 which is to operatively contact the surface 301 of the short-cam 300. The at least one hole 92/302 of the short-cam 90/300 is configured to receive the corresponding one or more cylinder pins 101 of the cylinder 100 so that rotation of the cylinder 100 may be transferred to the short-cam 90/300. The cylinder 100 is placed in the base body 30 and does not have any vertical movement.

Referring still to FIGS. 9, 10A, 10B, 11A, 11B, 12 and FIGS. 19A-19H, the padlock 10 may also include at least one combined-dial 270 having one or more teeth 271 formed on an interior surface thereof. Each of the combined-dials 270 has one or more indicia, which may be in the form of numbers, symbols, letters, colors or the like, corresponding to each tooth of the teeth 271. For example, in the exemplary embodiment illustrated ten indicia in the form of the numbers 0-9 are illustrated, and each of the combined-dials 270 has ten teeth 271. Each combined-dial 270 may have a reset hold 272 formed therein, and a ratchet-slot 273 on an exterior surface thereof, where each ratchet-slot 273 corresponds to a tooth of the teeth 271. The padlock 10 may also include one or more clutches 130, where each clutch 130 of the one or more clutches 130 includes at least one teeth-slot 131 configured for engagement with the teeth 271 on a corresponding combined-dial 270. The padlock 10 may have a set of combined-dials 270, for example four, and each teeth of each combined-dial 270 may be assembled to the corresponding teeth-slots 131 of the clutch 130 corresponding to the combined-dial 270. The teeth 271 are engaged with the corresponding teeth-slots 131 of the clutch 130 at all times except during the reset mode of the padlock 10. Once the teeth-slot 131 engages to the teeth 271, the rotation of the combined-dial 270 will transfer this rotational movement to the clutch 130. Each clutch 130 may also include a true-gate 132 and one or more false-gates 133 formed in a periphery of the clutch 130. In the locked mode of the padlock 10, when the true gate 132 of each of the clutches 130 do not align with the corresponding extended-pin 153 of the control-plate 150, the control-plate 150 cannot be moved and the padlock 10 cannot be operated to the unlocked mode. In the locked mode, the clutches 130 have been rotated such that at least one of the false gates 133 aligns with at least one of the extended-pins 153. In this case, the control plate 150 can only move a little distance of the depth of the false gate 133. This will create a faulty signal so that an unauthorized user of the padlock 10 is not able to easily locate the true gates 132 of the clutches 130 and operate the padlock 10 to the unlocked mode. The clutch 130 may be positioned in the channel/cavity formed by the clutch-slot 39/48 of the base-body 30/interior-cover 40. Each clutch 130 may further include a spring-hole 134 formed on one side of the clutch 130, and a reset button 135 extending from the other side of the clutch 130 from the spring-hole 134. The spring-hole 134 is configured to allow the clutch spring 210 to pass through and let the clutch spring 210 contact the clutch-spring-wall 30*g* of the base-body 30. The reset-hole 272 of each combined-dial 270 will let the reset button 135 of the corresponding clutch 130 pass through. The padlock 10 may also include at least one wheel-cover 140 having a reset hole 141 formed therein. The reset buttons 135 which will travel and pass through the reset holes 272/141 of the corresponding combined-dials 270 and wheel-covers 140. Each wheel-cover 140 may be press fit onto a corresponding combined-dial 270 to cover up the combined-dial 270 and the clutch 130. By doing so, the combined-dial 270 will have an appearance corresponding to an object, e.g., wheel of a vehicle such as a car, on the exterior of the padlock 10.

Referring now to FIGS. 13-17 and FIGS. 19A-19H, the padlock 10 may also include a control-plate 150 having at least one curved-surface 151 extending therefrom, and configured to contact the clutch 130 when the padlock 10 is in the locked mode. In the locked mode, pushing the reset button 135 of the clutch 130 will not lead to the reset mode. As the curved-surface 151 of the control-plate 150 will block the clutch 130 from moving inward. The control-plate 150 may include at least one clutch-spring hole 152 formed therein, and at least one extended-pin 153 extending from the control-plate 150 at least substantially adjacent to each of the clutch-spring holes 152. Although the control-plate 150 will be moving around the control-plate-slot 38/47 within the base-body 30 and interior-cover 40, the shape of the clutch-spring-hole 152 design is such that the clutch spring 210 will always be pushing the clutch 130 toward the combined-dial 270 such that the teeth-slot 131 of the clutch 130 will always engage to the teeth 271 of the combined-dial 270, and the clutch spring 210 will not interfere with the movement of the control-plate 150. The control-plate 150 may also include at least one connected-plate receiving cutout 154 formed in the control-plate 150. In an exemplary embodiment of the padlock 10, there may be two control-plates 150 of and each control plate 150 is operably engaged with one side set of combined-dials 270 (two combined-dials 270 per control plate 150). If the padlock 10 contained six combined-dials 270, then the control plate 150 can be expanded to have three extended-pins 153 and three clutches 130 on each side. The padlock 10 may also include a connected-plate 160 configured for operative engagement with each of the control-plate 150. The connected-plate 160 may include a contact-wall 161 extending therefrom, at least one spring-wall 162 and at least one extended-pointer 163 formed therein. There is an extended-cam spring 230 which is installed in between the spring wall 162 of the connected-plate 160 and the extended-cam-spring-wall 30*j* of the base body 30. This extended-cam-spring 230 will always push spring wall 162 of the connected-plate 160 downward and further pushes control-plate 150, the button 170, and the cam 70 downward. In the locked mode, the extended-radius 73 of cam 70 is inside the upper and lower contact-wall 161 of the connected-plate 160. The movement of connected-plate 160 will lead the cam 70 to move in the same manner. This will further improve the locking strength of the padlock 10, as the cam 70 can only move vertically when the correct code combination is present on the combination mechanism since the connected-plate 160 is connected to the control plate 150 and the clutches 130. Any exterior force cannot force the cam 70 to jump upward to unlock the padlock 10. The padlock 10 may also have a button 170 having at least one extended-wing 171 and a reset-stopper hole 172 formed therein. The control-plate 150 may have two or more connected-plate-receiving cutouts 154, with one end to connect the extended-pointer 163 of the connected-plate 160, and the other end of the connected-plate-receiving-cutout 154 connected to the extended-wing 171 of the button 170. This means that the control-plate 150, the connected-plate 160, and the button 170 are being assembled together with the same vertical movement. In this case, the rectilinear movement of the control-plate 150 within the base-body 30/interior-cover 40 is controlled by the alignment of the true gate 132 of the clutch 130 and the extended-pin 153 of the control-plate 150. In the locked mode, since at least one of the true gates 132 and one of the extended-pins 153 are not aligned, the control-plate 150 cannot operate the padlock 10 into the unlocked mode. Since the control-plate 150 is restrained, the contact-wall 161 will remain in the locked position which will not push the extended-radius 73 of the cam 70 in an unlocked position. This means opening of the padlock 10 via the combination mechanism is restricted. The padlock 10 may also include an extended-cam spring 230 which is installed in between the spring-wall 162 of the connected-plate 160 and the extended-cam-spring-wall 30*j*. As a result of the interaction between the connected-plate 160, the control-plate 150, the button 170 and the cam 70, this spring 230 will always push the connected-plate 160, the control-plate 150, the button 170, and the cam 70 downward in the locked mode. The extended-cam spring 230 will push downward until the spring wall 162 of the connected-plate 160 contacts the wall 83 of the extended-cam 80. The wall 83 of the extended-cam 80 is placed underneath the spring-wall 162 of the connected-plate 160. The extended-cam spring 230 will always push the connected-plate spring-wall 162 downward which makes the connected-plate 160 push downward to let the spring-wall 162 to contact the wall 83 of the cam 80 and hence, due to the interaction of the control-plate 150, the connected-plate 160, the button 170, the cam 70 and the clutches 130, the padlock 10 is in the locked mode. The extended-cam 80, the short-cam 90/300, and cylinder 100 is in this sandwiched position where there is no vertical movement in any mode. The extended-radius 73 of the cam 70 is fully engaged and sits in between the two halves of the contact-wall 161 of the connected-plate 160. As the connected-plate 160 remains in place so does the cam 70. The extended-radius 73 of the cam 70 is configured to engage inside and securely fasten to a contact-wall 161 of a connected-plate 160. The movement of the connected-plate 160 is configured to cause the cam 70 to move in the same manner. The cam 70 can only move vertically when the correct code combination of the combination mechanism has been entered as the connected-plate 160 is connected to the control plate 150 and the one or more clutches 130. Any exterior force could not force the cam 70 to jump upward to open the padlock 10. The padlock 10 may also include a ratchet-pin holder 180 for each combined-dial 270 of the padlock 10. The ratchet-pin holder 180 may include a ratchet-pin 181 configured for engagement with the one or more ratchet-slots 273 of the combined-dial 270, and a ratchet-spring 182 configured to urge the ratchet-pin 181 into the rachet-slots 273 of the combined-dial 270 in order to produce a ratchet-like feel as the combined-dial 270 is rotated. Each of the ratchet-slots 273 of each of the combined-dials 270 are configured to receive a corresponding ratchet-pin 181 which is held in place by the ratchet-pin-holder 180, and the spring 182 exerts a force so that the ratchet-pins 181 are always in contact with one of the ratchet-slots 273 of the combined-dial 270 corresponding to the ratchet-pin 181. The portion of the combined-dial 270 having the ratchet-slots 273 is held in place in the housing of the padlock 10 by inner-wheel-slot 30*f*/40*f* of the combined base-body-30/interior-cover 40. Once it is in this position, the combined-dial 270 cannot be pulled away from the combined base-body 30 and interior-cover 40. The padlock 10 may also include a rod 280 configured for positioning in the flexible-end hole 32/42, and engagement with a rod spring 290 that urges the rod 280 in a direction towards and/or contact with the flexible-end-52 of the cable 50. The rod 280 may include a spring receive cutout 281 configured to engage with the rod spring 290. The rod 280 may also include a surface 282 having a size substantially the same as the flexible-end hole 32/42 so as to allow for movement of the rod 280 along the flexible-end hole 32/42. The rod 280 may also have at least one extended-fin 283 extending from the surface 282 configured and dimensioned for rectilinear movement along the spring-loaded member slot 30*e* of the base-body 30 and/or the spring-loaded member slot 40*e* of the interior-cover 40. The extended-fin 283 which is assembled inside the spring-loaded-member-slot 30*e*/40*e* of the base-body 30 and interior-cover 40. This will make the movement of the extended-fin 283 of the rod 280 move within the spring-loaded member slots 30*e*/40*e*. Hence, the rod 280 will only have vertical movement, without any rotational movement. The extended-cam 80 contains a wall 83 which sits below of the spring-wall 162.

In the locked mode of the combination mechanism, since the connected-plate 160 is being restricted from moving, the spring-wall 162 remains in place and has no vertical movement. Furthermore, when there is no correct key cut 260 inserted into the cylinder 100 to turn the cylinder 100, the extended-cam 80 remains without movement. The pass way 81 of the extended-cam 80 carries the tail 75 of the cam 70. As there is no movement, the extended-cam 80 and the cam 70 will have no movement and the round-end 62 of the bolt 60 will engage in the bolt-receiving-cutout 53 of the flexible-end 52 of the cable 50 and in the locked mode position. The cam 70 has a lock-surface 72 which when in the locked mode position will always align to the flat-end 61 of the bolt 60. The other side round-end 62 of the bolt engages to the bolt-receiving-cutout 53 of the flexible-end 52 of the cable 50. Since the control-plate 150 has no movement, then the padlock 10 remains in the locked mode. The cylinder 100 contains at least one pin 101 configured to be engaged with the corresponding holes 92/302 of the short-cam 90/300. The surface 301 of the short-cam 300 will contact the slot 82 of the extended-cam 80 for lock opening via the key mechanism usage. Since no rotation of the cylinder 100 is present, the short-cam 300 and the extended-cam 80 will continue to have no movement. As there is no movement, the cam 70 will have no movement.

Referring now to FIGS. 20A-20H, the operation of the padlock 10 to the unlocked mode by the combination mechanism will now be discussed. It is understood that the operation of the padlock 10 by the combination mechanism is the same regardless of whether the padlock 10 contains the cam 90 (FIGS. 20A-20D) or cam 300 (FIGS. 20E-20H). As a user turns the combined-dials 270 the corresponding clutches 130 rotate in the same manner as result of the engagement of the teeth 271 with the teeth-slot 131 of the clutches 130. As the clutches 130 rotate, the true-gate 132 of each clutch 130 will align with the corresponding extended-pin 153 of the control-plate 150 if the correct indicia for each of the respective combined-dials 270 has been selected corresponding to the correct code combination. As the true-gates 132 align with the extended-pins 153, the user can push the button 170 such that the extended-pin 153 of the control-plate 150 will be able to move upward into the true-gate 132 of the clutch 130. The extended-wing 171 of the button 170 is assembled to one of the connected-plate-receiving-cutouts 154 of the control-plate 150. Therefore, when all of the true gates 132 of the clutches 130 align with all of the extended-pins 153 of the control-plates 150, the button 170 will be allowed to push upward to let the extended-pins 153 enter and move inward to the true-gate 132 of the clutch 130. The other end of the connected-plate-receiving-cutout 154 is linked to the extended-pointer 163 of the connected-plate 160. As the button 170 is being pushed upward so will the control-plate 150 and connected-plate 160. As the connected-plate 160 moves upward, the contact-wall 161 will urge the extended-radius 73 of the cam 70 to drive the cam 70 to move upward as the contact-wall 161 will have two halves to receive the extended-radius 73. A torque spring 200 is assembled in between the torque-spring-slot 33 of the base body 30. As the cam 70 moves upward, the rod 280 will move upward as well. The rod 280 moves upward as the cam 70 is pushed upward, the round-end 62 of the bolt 60 is forced to move inward such that the round-end 62 of the bolt 60 will disengage away from the bolt-receiving-cutout 53 of the cable 50. The flexible-end 52 of the cable will pop out of the flexible-end-hole 22/32/42 of the external-cover 20, base-body 30, and interior-cover 40. The round-end 62 of the bolt 60 will contact the surface 282 of the rod 280, and the flat-end 61 of the bolt 60 will be placed under the slope 74 of the cam 70 when the padlock 10 is operated to the unlocked mode via the combination mechanism. The pass way 81 of the extended-cam 80 may have a square shape, and a tail 75 of the cam 70 may have a corresponding square shape to be placed inside the pass way 81, which engagement prevents the cam 70 from having rotational movement during operation of the padlock 10 from the locked mode to the unlocked mode by the combination mechanism. The pass way 81 contains enough area, and the tail 75 may have enough length to allow the tail 75 to travel from the unlocked mode to the locked mode by the combination mechanism without removing the tail 75 from the pass way 81 of the extended-cam 80. As the button 170 is being pushed upward to operate the padlock 10 to the unlocked mode via the combination mechanism, the padlock 10 may be placed in the reset mode as discussed further below, or the user may release the button 170, and the extended-cam spring 230 will push the connected-plate 160 downward such that the connected-plate 160, button 170, and the control-plate 150 are all pushed downward as they are interconnected. The extended-cam spring 230 is assembled in between the connected-plate-spring-wall 30*i* of the base-body 30 and the spring-wall 162 of the connected-plate 160. As the user releases the button 170, the spring 230 pushes the connected-plate 160 downward. Although the connected-plate 160 is being pushed downward, the flat-end 61 of the bolt 60 is being engaged underneath the slope 74 of the cam 70. Then the cam 70 will stay in the unlocked position. Meanwhile, the extended-pin 153 of the control-plate 150 will still engage in the true-gate 132 of the clutch 130. This combo captive design will help the user maintain their correct code combination while the padlock 10 is in the unlocked mode as a result of operation of the combination mechanism. Since the cylinder 100 of the key mechanism does not have the correct cut key 260 inserted in the cylinder 100, the cylinder 100 does not rotate, and the short-cam 90/300 and extended-cam 80 remain in place. The extended-cam 80, the short-cam 90/300, and the cylinder 100 have no action during operation of the padlock 10 to the unlocked mode by the combination mechanism. To return the padlock 10 to the locked mode and relock the padlock 10, the user can push the flexible-end 52 of the cable 50 into the flexible-end-hole 22/32/42 of the external-cover 20/base-body 30/interior-cover 40. The flexible-end 52 will push the rod 280 downward such that the bolt-receiving-cutout 53 will align to the round-end 62 of the bolt 60. As they align then the extended-cam spring 230 will push the cam 70 downward such that the slope 74 of the cam 70 will push the flat-end 61 of the bolt 60 outward such that the round-end 62 of the bolt 60 will engage back to the bolt-receiving-cutout 53 of the cable 50. As they engage, the flat-end 61 of the bolt 60 will contact lock-surface 72 of the cam 70, and it will further confirm the engagement of the bolt-receiving-cutout 53 of the cable 50 and the round-end 62 of the bolt 60. Furthermore, the extended-cam spring 230 pushes the control-plate 150, connected-plate 160, button 170, and the cam 70 downward such that the extended-pin 153 will disengage away from the true gate 132 of the clutch 130. The user can now scramble the combined-dials 270 to rotate the true gates 132 of the clutches 130 to misalign from the extended-pins 153 of the control-plates 150 to return the padlock 10 to the locked mode.

Referring now to FIGS. 21A-21H and 24A-24B, the operation of the padlock 10 by the key mechanism will now be discussed. FIGS. 21A-21D include the short-cam 90 as a component of the padlock 10, and FIGS. 21E-21H and 24A-24B include the alternative embodiment of the short-cam 300 as a component of the padlock 10. The operation of the padlock 10 from the locked mode to the unlocked mode by the key mechanism is the same regardless of whether the padlock 10 includes the short-cam 90 or the short-cam 300. However, when the padlock 10 includes the short-cam 90, the padlock 10 may include a captive key mechanism requiring returning of the padlock 10 to the locked mode before the correct cut key 260 can be withdrawn from the cylinder 100. When the padlock 10 includes the short-cam 300, the padlock 10 may include a non-captive key mechanism in which it is not necessary to return the padlock 10 to the locked mode before the correct cut key 260 can be withdrawn from the cylinder 100. If the correct cut key 260 is inserted into the cylinder 100, the user can turn the cylinder 100. The pins 101 of the cylinder 100 are engaged with the corresponding holes 92/302 of the short-cam 90/300. As the cylinder 100 turns, the short-cam 90/300 turns in the same manner. As the short-cam 90/300 turns, the slot 91/surface 301 of the short-cam 90/300 will drive the slot 82 of the extended-cam 80 to rotate the extended-cam 80 in the same manner. The extended-cam 80 is placed inside of the extended-cam-slot 36 of the base-body 30. The slot 36 will act as a rib to hold the extended-cam 80 in place. The pass way 81 of the extended-cam 80 is shaped like a square and a tail 75 of the cam 70 is placed inside pass way 81. The rotational movement of the extended-cam 80 will turn the cam 70 in the same manner. As the slot 91/surface 301 of the short-cam 90/300 turns the slot 82 of the extended-cam 80 rotates. As the extended-cam 80 rotates, the pass way 81 will rotate the tail 75 of the cam 70. As the cam 70 rotates, the flat-side 76 of the cam 70 will align to the flat-end 61 of the bolt 60. The rod 280 moves upward as the cam 70 is being rotated, and the round-end 62 of the bolt 60 is forced to move inward such that the round-end 62 of the bolt 60 will disengage away from the bolt-receiving-cutout 53 of the cable 50. The flexible-end 52 of the cable will pop out of the flexible-end-hole 22/32/42 of the external-cover 20, base-body 30 and interior-cover 40 as a result of the rod spring 290 urging the rod 280 upward and away from the padlock 10. The rod 280 contains an extended-fin 283 which is assembled inside the spring-loaded member slot 30*e*/40*e* of the base-body 30 and interior-cover 40. This will make the extended-fin 283 of the rod 280 to move within the slots 30*e*/40*e*. The round-end 62 of the bolt 60 will contact the surface 282 of the rod 280 and the flat-end 61 of the bolt 60 will contact the flat-side 76 of the cam 70. The following components remain inactive and/or undisturbed when the padlock 10 is operated to the unlocked mode by the key mechanism: combined dial 270, clutch 130, control-plate 150, connected-plate 160, and button 170. The user could keep rotating the cylinder 100 to a degree provided by the angle-control-member 102 of the cylinder 100 and the cylinder-turning-angle-control-slot 40*a*.

Referring now to FIGS. 21A-21D, once the padlock 10 is operated to the unlocked mode by the key mechanism, the correct cut key 260 must remain in the cylinder 100. The key 260 cannot be withdrawn out of the cylinder 100 due to the flat-end 76 of the cam 70 being engaged to the flat-end 61 of the bolt 60. The round-end 62 of the bolt is still in contact with the surface 282 of the rod 280. As they are in this engagement position, the extended-cam 80, the short-cam 90 and the cylinder 100 remain in this unlocked mode position. In order to return the padlock 10 the locked mode and withdraw the correct cut key 260 when the padlock 10 has the captive key mechanism as a result of the short-cam 90, the user reinserts the flexible-end 52 of the cable 50 into the flexible-end-hole 22/32/42 of the external-cover 20/base-body 30/interior-cover 40. The flexible-end 52 will push the rod 280 downward such that the bolt-receiving-cutout 53 will align with the round-end 62 of the bolt 50. The torque spring 200 has two tails, one tail mounted on the torque-spring-tail-slot 30*k*, and the other tail mounted on the torque-spring-slot 85 of the extended-cam 80. Since the tail 75 is placed inside of the pass way 81 of the extended-cam 80 and the shape of the tail 75 and pass way 81 match, the torque spring 200 will rotate the extended-cam 80 back to the locked mode position and this torque spring 200 will also help to rotate the cam 70 from the unlocked mode position back to the locked mode position. As the cam 70 rotates, the flat-side 76 of the cam 70 will push the flat-end 61 of the bolt 60 to move outward such that the round-end 62 of the bolt 60 will engage back to the bolt-receiving-cutout 53 of the cable 50. As they engage, the flat-end 61 of the bolt 60 will contact lock-surface 72 of the cam 70, and it will further confirm the engagement of the bolt-receiving-cutout 53 of the cable 50 and the round-end 62 of the bolt 60. As the extended-cam 80 rotates back to the locked mode position, the slot 82 will drive the slot 91 of the short-cam 90 back to the locked position. This will further drive the cylinder 100 back to the locked mode position and allow for withdrawal of the correct cut key 260 from the cylinder.

Referring now to FIGS. 21E-21H and 24A-24B, once the padlock 10 is operated to the unlocked mode by the key mechanism, the short-cam 300 allows for the correct cut key 260 to be removed from the cylinder 100 as a result of a non-captive key mechanism. The short cam 300 contains the free-rotate-area 303 configured to provide a space in which the slot 82 can rotate after the correct cut key 260 has caused rotation of the cylinder 100 to allow for the cylinder 100 and the short-cam 300 to return to the locked position of the cylinder 100 in order to allow for removal of the correct cut key 260. The user of the correct cut key 260 can rotate the cylinder 100 back to the locked mode position as the free-rotate-area 303 will not block the 82 slot and permits the cylinder 100 and the short-cam 300 to rotate from the unlocked mode position to the locked mode position. As a result of rotation of the cylinder 100 to the unlocked mode position, the extended-cam 80 has been rotated and will not travel back to the locked position until a flexible-end 52 of a cable 50 has been reinserted into a flexible-end-hole 22/32/42 of the external-cover 20/base-body 30 and interior-cover 40. This is because the tail 75 of the cam 70 is connected to the pass way 81 of the extended cam 80, which allows for rotational motion of the extended cam 80 to be transferred to the cam 70. As the cam 70 rotates then a flat-side 76 of the cam 70 will align to a flat-end 61 of a bolt 60. A rod spring 290 will push the rod 280 upward such that a round-end 62 of the bolt 60 will be urged to move away from a bolt-receiving-cutout 53 of the cable 50, and disengage from the bolt-receiving-cutout 53 of the cable 50. The flexible-end 52 of the cable 50 will pop out of the flexible-end-hole 22/32/42 of the external-cover 20/base-body 30 and interior-cover 40. When the flexible-end 52 of the cable 50 is reinserted into the flexible-end-hole 22/32/42, the round-end 62 of the bolt 60 can move in the direction of the bolt-receiving-cutout 53 and disengage the flat-end 61 of the bolt 60 from the flat-side 76 of the cam 70. The torque spring 200 is engaged with a torque-spring-slot 85 of the extended cam 80 and rotates the cam 70 and the extended cam 80 back into the locked mode position so that the slot 82 of the extended-cam 80 is once again in operative contact with the surface 301 of the short-cam 300. After operating the padlock 10 to the unlocked mode via the correct cut key 260, the key user could rotate the cylinder 100 back to locked mode position. This rotation movement will only drive the short-cam 300 as the pin 101 and 302 holes are always in engagement. The short-cam 300 contains the free-rotate-area 303 which does not contact the slot 82 of the extended-cam 80. The user can withdraw the correct cut key 260. This means that the extended-cam 80 is still in the unlocked mode position. The user can push the flexible-end 52 of the cable 50 into the flexible-end-hole 22/32/42 of the external-cover 20/base-body 30/interior-cover 40. Then the flexible-end 52 will push the rod 280 downward such that the bolt-receiving-cutout 53 will align to the round-end 62 of the bolt 60. The torque spring 200 has two tails, one tail mounted on the torque-spring-tail-slot 30*k* and the other tail mounted on the torque-spring-slot 85 of the extended-cam 80. Since the tail 75 is placed inside of the pass way 81 of the extended-cam 80 and the shape of the tail 75 and pass way 81. The torque spring 200 will rotate the extended-cam 80 back to the locked mode position and the torque spring 200 will also help to rotate the cam 70 from the unlocked mode position to the locked mode position. As the cam 70 rotates, the flat-side 76 of the cam 70 will push the flat-end 61 of the bolt 60 to move outward such that the round-end 62 of the bolt 60 will engage back to the bolt-receiving-cutout 53 of the cable 50. As they engage, the flat-end 61 of the bolt 60 will contact lock-surface 72 of the cam 70, and it will further confirm the engagement of the bolt-receiving-cutout 53 of the cable 50 and the round-end 62 of the bolt 60.

Referring now to FIGS. 22A-22H, the resetting and/or reconfiguring of the correct code combination for the combination mechanism of the padlock 10 will now be discussed. The resetting and/or reconfiguring of the correct code combination for the padlock is the same regardless of whether the padlock 10 includes the short-cam 90 (FIGS. 22A-22D) or the short-cam 300 (FIGS. 22E-22H). To reset and/or reconfigure the combination code, the padlock 10 must have been operated into the unlocked mode by the combination mechanism. As the combination user pushes the button 170 upward in the unlocked mode, the user can keep holding the button 170 and stick a screwdriver or other object into the reset-stopper-hole 172 of the button 170 such that the button 170 will not return to its resting position. As the button 170, connected-plate 160 and control-plate 150 are maintained in this upward position, the curved-surfaces 151 of the control-plates 150 will not block the clutches 130 from moving toward the reset mode position. The extended-pin 153 of the control-plate 150 will always be engaged to the true-gate 132 of the clutch 130 in the reset mode. As the true-gate 132 has a length longer than the other gates, this makes the extended-pin 153 to engage with the reset mode all the time. As the true-gate 132 of the clutch 130 engages to the extended-pin 153, the clutch 130 will not be able to rotate in the entire reset mode. The user can use a reset tool 250 to push the reset button 135 of each of the clutches 130 inward. As the clutch 130 moves inward, the teeth-slots 131 of the clutch 130 disengage from the teeth 271 of the corresponding combined-dial 270. While the reset button 135 is retained inward, the user can rotate the combined-dial 270 to set the new correct code combination. Once the user sets the new correct code combination for the combined-dial 270, the user can remove the reset tool 250 and the clutch spring 210 will exert a force such that the teeth-slot 131 of the clutch 130 will engage back to the teeth 271 of the combined-dial 270. If all of the combined-dials 270 are in the new code, the user can further remove the object which is inserted in the reset-stopper-hole 172 of the button 170 such that button 170 will return to the rest position. As the button 170 moves downward, the control-plate 150 will move downward and the extended-pin 153 will move away from the true-gate 132. The user can scramble the combined-dials 270 to return the padlock 10 to the locked mode. The padlock 10 is now set to the new correct code combination.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed:

1. A padlock, comprising:

an external cover coupled to a base body to form a housing of the padlock;

a cable having a fixed end retained within the housing, and a flexible end retained within the housing when the padlock is in a locked mode, and removable from the housing when the padlock is in an unlocked mode;

a combination mechanism comprising at least one combined dial and configured to allow operation of the padlock from the locked mode to the unlocked mode;

a key mechanism comprising a cylinder configured for operation by a correct cut key, wherein the key mechanism is configured to allow operation of the padlock from the locked mode to the unlocked mode;

a cam operable between a locked position and a first unlocked position by the combination mechanism, and operable between the locked position and a second unlocked position by the key mechanism, wherein when the cam is in the first unlocked position or the second unlocked position the padlock may be placed in the unlocked mode; and a short cam operably coupling the cylinder and the cam, wherein the short cam is configured to provide either captive key functionality or non-captive key functionality of the correct cut key when the padlock is in the unlocked mode;

wherein the external cover has an appearance of a wheeled vehicle, and the at least one combined dial has an appearance of a wheel of the wheeled vehicle;

wherein the combination mechanism comprises four combined dials, wherein two of the four combined dials are positioned on one side of the external cover, and the other two of the four combined dials are positioned on another side of the external cover to provide an appearance of wheels of the wheeled vehicle; and wherein each of the combined dials include a plurality of indicia selected from numbers, letters, signs, shapes, symbols, characters, or combinations thereof, and wherein a combination of one indicia from each of the combined dials comprises a correct code combination for the combination mechanism.

2. The padlock according to claim 1, wherein the combination mechanism further comprises at least one clutch for each of the at least one combined dial;

wherein each combined dial comprises a plurality of teeth, and each clutch comprises a teeth slot for each of the plurality of teeth of the combined dial; and wherein the teeth slots of the clutch are configured for operative engagement with the plurality of teeth of the combined dial such that rotation of the combined dial is transferred to rotation of the clutch.

3. The padlock according to claim 2, wherein the combination mechanism further comprises at least one control plate, wherein each control plate is operatively connected to at least one clutch of the at least one clutches;

wherein the combination mechanism further comprises a connecting plate operatively connecting the at least one control plate with the cam; and wherein the combination mechanism further comprises a button operatively connected to the at least one control plate.

4. The padlock according to claim 3, wherein each of the at least one control plate comprises at least one extended pin, and each clutch of the at least one clutch contains a true gate and at least one false gate configured for engagement with one of the at least one extended pin, wherein the padlock may be operated from the locked mode to the unlocked mode when each of the at least one extended pin engages with the true gate of the corresponding clutch of the at least one clutch, and wherein the false gates do not allow the padlock to be operated from the locked mode to the unlocked mode if at least one extended pin of the at least one extended pin is engaged with the false gate.

5. The padlock according to claim 3, wherein the control plate comprises at least one cutout configured to receive an extended-pointer of the connected plate and a wing of the button, wherein movement of any of the control plate, connected plate or button will be transferred to other two, and wherein the control plate, connected plate and button move jointly together.

6. The padlock according to claim 3, wherein the connected plate comprises a contact wall having two halves and configured for engagement with the cam, wherein the cam further comprises an extended radius configured for positioning between the two halves of the contact wall, and wherein rectilinear movement of the connected plate within the housing of the padlock controls movement of the cam between the locked position and the first unlocked position.

7. The padlock according to claim 3, further comprising a bolt configured to lockingly engage the flexible end of the cable when the padlock is in the locked mode, and having a flat end and a round end;

wherein the cam further comprises a lock surface configured for engagement with the flat end of the bolt when the padlock is in the locked mode, and a slope configured for engagement with the flat end of the bolt when the cam is in the first unlocked position and the padlock is in the unlocked mode; and wherein rectilinear movement of the connected plate within the housing of the padlock controls movement of the cam between the locked position and the first unlocked position.

8. The padlock according to claim 3, wherein each clutch of the at least one clutch comprises a reset button extending therefrom, and each control plate of the at least one control plate comprises at least one curved surface configured for contact with the corresponding clutch when the padlock is in the locked mode, and configured to be spaced apart from the corresponding clutch when the padlock is in the unlocked mode, and wherein the reset button is configured for receipt of a reset tool configured to separate the clutch from the corresponding combined dial to operate the padlock into a reset mode.

9. The padlock according to claim 1, wherein the key mechanism further comprises an extended cam operatively coupled to the cam and the short cam, wherein the extended cam comprises a slot configured for engagement with the short cam, and wherein rotational movement of the cylinder is transferred to the extended cam by the short cam, and to the cam by the extended cam.

10. The padlock according to claim 9, further comprising a bolt configured to lockingly engage the flexible end of the cable when the padlock is in the locked mode, and having a flat end and a round end;

wherein the cam comprises a lock surface configured for contact with the flat end of the bolt when the padlock is in the locked mode, and a flat side configured for contact with the flat end of the bolt when the padlock is in the unlocked mode.

11. The padlock according to claim 10, wherein the correct cut key is configured to cause rotational movement of the cylinder, and the rotational movement of the cylinder is transferred to the cam by the short cam and the extended cam, wherein the rotational movement of the cam causes movement of the cam from the locked position in which the lock surface of the cam is in contact with the flat end of the bolt to the second unlocked position in which the flat side of the cam is in contact with the flat end of the bolt.

12. The padlock according to claim 9, wherein the extended cam further comprises a pass way, and the cam further comprises a tail of the cam configured for at least partial insertion into the pass way of the extended cam, wherein the pass way and the tail have complementary shapes such that rotational movement of the extended cam is transferred to the cam.

13. The padlock according to claim 9, wherein the short cam comprises a surface to contact the slot of the extended-cam when the padlock has been operated to the unlocked mode by the key mechanism, and wherein as a result of the contact between the surface and the slot a captive key mechanism is configured to retain the correct cut key within the cylinder until the padlock has been returned to the locked mode.

14. The padlock according to claim 13, further comprising a torque spring configured to rotate the extended-cam when the padlock is returned to the locked mode so the correct cut key can be withdrawn from the cylinder.

15. The padlock according to claim 9, wherein the short cam comprises a free rotate area to allow rotation of the short cam and cylinder without rotation of the extended cam to provide a non-captive key mechanism so that the correct cut key may be withdrawn from the cylinder while the padlock is in the unlocked mode.

16. The padlock according to claim 1, further comprising a rod engaged with a spring configured for operable engagement with the flexible end of the cable to cause the flexible end of the cable to pop out of the housing of the padlock when the cam is in the first unlocked position or the second unlocked position.

* * * * *